United States Patent
Kumar et al.

(10) Patent No.: US 11,263,583 B1
(45) Date of Patent: Mar. 1, 2022

(54) INFERRED DETERMINATION OF INTERACTION USING DATA FROM WEIGHT SENSORS

(71) Applicant: AMAZON TECHNOLOGIES, INC., Seattle, WA (US)

(72) Inventors: Dilip Kumar, Seattle, WA (US); Liefeng Bo, Seattle, WA (US); Nikhil Chacko, Seattle, WA (US); Robert Crandall, Seattle, WA (US); Nishitkumar Ashokkumar Desai, Redmond, WA (US); Jayakrishnan Kumar Eledath, Kenmore, WA (US); Gopi Prashanth Gopal, Redmond, WA (US); Gerard Guy Medioni, Seattle, WA (US); Paul Eugene Munger, Seattle, WA (US); Kushagra Srivastava, Issaquah, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 209 days.

(21) Appl. No.: 15/939,061

(22) Filed: Mar. 28, 2018

(51) Int. Cl.
*G01G 19/42* (2006.01)
*G06Q 10/08* (2012.01)
*G06N 7/00* (2006.01)
*G01G 23/37* (2006.01)

(52) U.S. Cl.
CPC .......... *G06Q 10/087* (2013.01); *G01G 19/42* (2013.01); *G01G 23/3707* (2013.01); *G06N 7/005* (2013.01)

(58) Field of Classification Search
CPC .. G06Q 10/087; G01G 19/42; G01G 23/3707; G06N 7/005
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |

(Continued)

OTHER PUBLICATIONS

Borstell et al., Pallet Monitoring System Based on a Heterogeneous Sensor Network for Transparent Warehouse Processes, Nov. 13, 2014, 2014 Sensor Data Fusion: Trends, Solutions, Applications (SDF), 6 pp. (Year: 2014).*

(Continued)

*Primary Examiner* — Toan M Le
(74) *Attorney, Agent, or Firm* — Lindauer Law, PLLC

(57) ABSTRACT

Load cells measure the weight of items on a shelf. Weight changes occur as items are picked from or placed to the fixture. Information about these weight changes is used to determine an estimated location on the shelf of a weight change. Hypotheses are generated using information about where particular types of items are stowed, the weights of those particular types of items, information about the weight changes, and the estimated locations of the weight changes. A model is used to produce confidence values in the hypotheses based on a change in weight measured at a first side and a change in weight measured at a second side of the shelf. A hypothesis with a confidence value that exceeds the threshold may be selected and used to determine interaction data indicative of a quantity picked or placed, type of item, and location on the shelf.

20 Claims, 18 Drawing Sheets

(56) References Cited

U.S. PATENT DOCUMENTS

| | | | |
|---|---|---|---|
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |
| 10,148,918 | B1 | 12/2018 | Seiger et al. |
| 10,157,452 | B1 | 12/2018 | Tighe et al. |
| 10,244,363 | B1 | 3/2019 | Niranjayan et al. |
| 10,311,760 | B1 | 6/2019 | McMahon et al. |
| 10,438,164 | B1 | 10/2019 | Xiong et al. |
| 10,459,103 | B1 | 10/2019 | Shi et al. |
| 10,521,646 | B2 | 12/2019 | Adato et al. |
| 10,685,237 | B1 | 6/2020 | Mirza et al. |
| 2005/0077352 | A1 | 4/2005 | Gudbjartsson |
| 2007/0050271 | A1 | 3/2007 | Ufford et al. |
| 2011/0011936 | A1 | 1/2011 | Morandi et al. |
| 2012/0080517 | A1 | 4/2012 | Braunstein |
| 2012/0221495 | A1 | 8/2012 | Landers |
| 2012/0284132 | A1 | 11/2012 | Kim et al. |
| 2013/0284806 | A1 | 10/2013 | Margalit |
| 2014/0150519 | A1 | 6/2014 | Iizuka |
| 2014/0201041 | A1 | 7/2014 | Meyer |
| 2014/0297487 | A1 | 10/2014 | Bashkin |
| 2015/0012396 | A1* | 1/2015 | Puerini ............. G06K 9/00771 705/28 |
| 2015/0019391 | A1 | 1/2015 | Kumar et al. |
| 2015/0086107 | A1 | 3/2015 | Dedeoglu et al. |
| 2015/0254603 | A1 | 9/2015 | Bashkin |
| 2017/0228686 | A1 | 8/2017 | Rodriguez et al. |
| 2018/0114184 | A1 | 4/2018 | Brooks et al. |
| 2018/0137462 | A1 | 5/2018 | Zohar et al. |
| 2018/0158017 | A1 | 6/2018 | Jones et al. |
| 2018/0197139 | A1 | 7/2018 | Hill |
| 2018/0225625 | A1 | 8/2018 | DiFatta et al. |
| 2019/0000382 | A1 | 1/2019 | Fitzpatrick |
| 2019/0073627 | A1 | 3/2019 | Nakdimon et al. |
| 2019/0152634 | A1 | 5/2019 | Almogy et al. |
| 2019/0333039 | A1 | 10/2019 | Glaser et al. |
| 2020/0005319 | A1 | 1/2020 | Scarborough et al. |

OTHER PUBLICATIONS

Abstract of Borstell et al., Nov. 13, 2014, 1 pp. (Year: 2014).*

Ethridge et al., Single-Component Microcomputer Network Provides Data-Acquisition Shelf-Monitor System for Special Nuclear Material Real-Time Inventory, Feb. 1979, IEEE Transactions on Nuclear Science, vol. NS-26, No. 1, pp. 672-678 (Year: 1979).*

IEEE Xplore Search Results, May 2, 2021, 1 pp. (Year: 2021).*

Asthana, et al., "An Indoor Wireless System For Personalized Shopping Assistance", CiteSeerX, In Proceedings of EEE Workshop on Mobile Computing Systems and Applications, 1994. Retrieved from the Internet <URL:http://citeseerx.ist.psu.edu/viewdoc/summary?doi=10.1.1.127.3033>.

Crandall, et al., "Signal Processing Techniques", U.S. Appl. No. 15/199,030, The United States Patent and Trademark Office, filed Jun. 30, 2016.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011,Beijing, China, Sep. 17-21, 2011.Retrieved from the Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

Wilder, Andrew H., "Non-final Office Action dated Mar. 30, 2020", U.S. Appl. No. 15/939,080, The United States Patent and Trademark Office, dated Mar. 30, 2020.

Dimech, Andrew, "Weight Sensing Shelves", Video from YouTube, 3:20 duration, uploaded on Sep. 24, 2015. Retrieved from Internet: https://www.youtube.com/watch?v=71GboW_pWWc.

Mutschler, Joseph M., "Non-final Office Action dated Dec. 10, 2018", U.S. Appl. No. 15/195,964, The United States Patent and Trademark Office, dated Dec. 10, 2018.

Wilder, Andrew H., "Final Office Action dated Aug. 4, 2020", U.S. Appl. No. 15/939,080, The United States Patent and Trademark Office, dated Aug. 4, 2020.

Iwarere, Oluseye, "Non-final Office Action dated Jun. 23, 2020", U.S. Appl. No. 15/939,063, The United States Patent and Trademark Office, dated Jun. 23, 2020.

Park, Hyun D., "Non-final Office Action dated Apr. 30, 2020", U.S. Appl. No. 15/938,992, The United States Patent and Trademark Office, dated Apr. 30, 2020.

Iwarere, Oluseye, "Notice of Allowance dated Oct. 1, 2020", U.S. Appl. No. 15/939,063, The United States Patent and Trademark Office, dated Oct. 1, 2020.

Park, Hyun D., "Final Office Action dated Oct. 29, 2020", U.S. Appl. No. 15/938,992, The United States Patent and Trademark Office, dated Oct. 29, 2020.

Iwarere, Oluseye, "Non-final Office Action dated Aug. 26, 2021", U.S. Appl. No. 15/939,063, The United States Patent and Trademark Office, dated Aug. 26, 2021.

Park, Hyun D., "Non-final Office Action dated Jun. 24, 2021", U.S. Appl. No. 15/938,992, The United States Patent and Trademark Office, dated Jun. 24, 2021.

Wilder, Andrew H., "Notice of Allowance dated Jun. 11, 2021", U.S. Appl. No. 15/939,080, The United States Patent and Trademark Office, dated Jun. 11, 2021.

* cited by examiner

US 11,263,583 B1

INFERRED DETERMINATION OF INTERACTION USING DATA FROM WEIGHT SENSORS

INCORPORATED BY REFERENCE

U.S. patent application Ser. No. 14/576,263 titled "Sensor Data Processing System" filed Dec. 19, 2014, now U.S. Pat. No. 10,466,092, is hereby incorporated by reference for all that it contains.

U.S. patent application Ser. No. 15/195,964 titled "System to Determine User Interaction with Fixture" filed Jun. 28, 2016 is hereby incorporated by reference for all that it contains.

U.S. patent application Ser. No. 15/199,030 titled "Signal Processing Techniques" filed Jun. 30, 2016 is hereby incorporated by reference for all that it contains.

U.S. patent application Ser. No. 15/634,695 titled "Multi-Load Cell Weighing Shelf" filed Jun. 27, 2017, now U.S. Pat. No. 10,466,095, is hereby incorporated by reference for all that it contains.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1A:
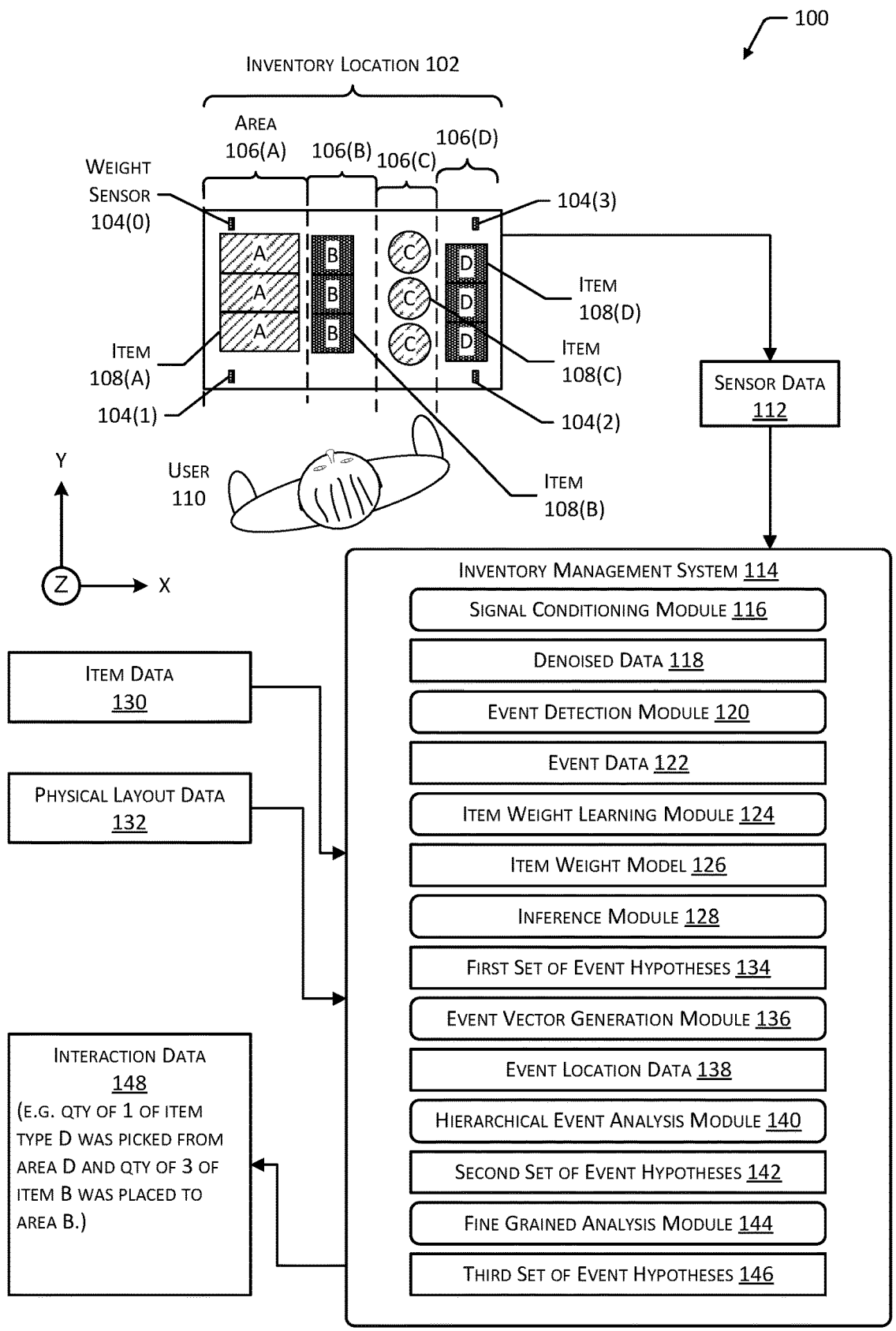
FIGS. 1A and 1B illustrate a system to determine interaction data about the pick (removal) or place (return or loading) of items stowed at an inventory location based at least in part on sensor data obtained from one or more weight sensors, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A material handling facility (facility) or other setting may utilize fixtures that provide inventory locations used to stow or otherwise hold items. For example, the fixtures may have shelves, with each shelf comprising a platform with different types of items stowed in areas such as lanes. The fixtures, or the environment around the fixtures, may include one or more weight sensors that generate sensor data.

The facility may include, or have access to, an inventory management system. The inventory management system may be configured to maintain information about items, users, condition of the facility, and so forth based at least in part on the sensor data. The inventory management system may use the sensor data to determine interaction data. The interaction data may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the inventory management system may generate interaction data that indicates what item the user picked from a particular lane on a shelf, and then use this interaction data to adjust the count of inventory stowed at that lane. The interaction data may then be used to bill an account associated with the user for the item that was picked.

The inventory locations may comprise one or more platforms equipped with weight sensors. For example, each platform may be supported by four weight sensors, with each weight sensor arranged near a respective corner of the platform. In other implementations, other numbers of weight sensors in different positions with respect to the shelf may be used. The weight sensors may comprise load cells that produce an analog signal that is subsequently converted into sensor data that is a digital representation of that analog signal.

A signal conditioning module processes the sensor data to produce denoised data. For example, an adaptive non-linear filtering technique may be used to produce denoised data that exhibits a higher signal-to-noise ratio compared to the original sensor data.

The denoised data associated with a particular platform is processed by an event detection module to determine first event data. The first event data may include information such as a start and stop time associated with a weight change. The first event data may include a coarse event and one or more sub-events within the coarse event. In one implementation, the event detection module may implement a cumulative sum (CUSUM) technique that determines whether the denoised data within a particular time window is indicative of an unstable state in which change in the weight begins, an unstable state in which change in the weight continues, or a stable state in which the change in the weight has ended. In some implementations, the first event data may be generated using a time window with a different length to facilitate detection of events.

An item weight learning module uses weight changes from events involving pick and place of individual ones of a particular type of item to generate a model of that type of item's weight. For example, the first event data may be filtered to find those events in which users picked or placed individual ones of an item from the inventory location. The weight changes associated with each of these events may be used to construct an item weight model, such as a probability distribution function. An observed weight change may be used as input to the item weight model which produces output comprising a probability value that the observed weight change is associated with the particular type of item associated with that model.

An inference module generates a first set of event hypotheses based on the first event data, physical layout data indicative of what types of items are stowed at particular places on the platform, and the item weight models for those types of items. As part of this process, the item weight model for a type of item in the hypotheses may be used to determine a left model and a right model. The left model comprises a first model, such as a probability distribution function, associated with the change in weight measured by the sensors on the left side of the platform while the right model comprises a second model associated with the change in weight measured by the sensors on the right side of the platform. Based on the measured weight change for the left and right sides and using the left and right models, a confidence value may be calculated for each hypothesis in the first set of event hypotheses. The first set of event hypotheses may then be ranked based on this confidence value. If a top ranked hypothesis exceeds a threshold value, that top ranked hypothesis may then be used to generate the interaction data. If not, the system may proceed as described next.

An event vector generation module may be used to generate event location data. The first event data may include weight change data from each of the weight sensors for each event, indicating the weight changes at particular corners of the platform from a first time to a second time. By using these weight changes, and given the known physical configuration of the platform and the position of the weight sensors, the system is able to determine a location of a center of gravity at a particular time that is associated with that event. These locations of the center of gravity at different times may be analyzed and used to provide event location data that indicates a particular area was associated with some activity that produced a weight change at a certain time.

The inference module may use the event location data to produce a second ranking of the first set of event hypotheses. In one implementation, a correspondence value may be determined that indicates a correspondence between a particular hypothesis and the event location data. This correspondence value may be used in conjunction with the confidence value to determine a value that is then used for the second ranking of the hypotheses in the first set of event hypotheses. For example, if the particular hypothesis specifies that at time t the type of item stowed at lane A was picked, and the event location data indicates that at time t activity was determined at lane A, the correspondence value would be high. However, if the event location data indicates that at time t activity was determined at lane D, the correspondence value would be low. In another implementation, the inference module may be configured to disregard or remove the hypotheses from the first set of event hypotheses that do not correspond to the event location data.

If a top ranked hypothesis in the second ranking exceeds a threshold value, that top ranked hypothesis may then be used to generate the interaction data. If not, the system may proceed as described next.

A hierarchical event analysis module may be used to modify and reassess the events present in the first event data. In some situations, the event detection module may produce two separate sub-events when only a single sub-event has taken place. The hierarchical event analysis module may compare the coarse event hypothesis with the aggregate of the top ranked hypotheses of the associated sub-events. If the two agree, the interaction data may be generated. If not, the hierarchical event analysis module may merge sub-events in the first event data to produce second event data. This second event data may then be processed as described above to generate a second set of event hypotheses, assess the resulting confidence values, and so forth. If the resulting rankings of the hypotheses in this second set of event hypotheses remain below the first or second thresholds, the system may iterate the process, successively merging sub-events. If a confidence value for a top ranked hypothesis exceeds the threshold values, the interaction data may be generated using the top ranked hypothesis. Otherwise, the process may continue to iterate through merging sub-events, until all of the sub-events have been merged. If the confidence values of the top ranked hypotheses resulting from those merged sub-events remain below the threshold values, the system may proceed as described next.

A fine grained analysis module may direct the event detection module to generate third event data using a time window with a different duration. For example, the fine grained analysis module may select a time window that is longer than that used to generate the event data. For example, the event detection module may use a 100 ms time window to generate the first event data and a 250 ms time window to generate the third event data. The third event data may then be processed as described above to generate a third set of event hypotheses, the resulting confidence values assessed, and so forth. If a confidence value for a top ranked hypothesis exceeds the threshold values, the interaction data may be generated using the top ranked hypothesis. If the confidence values of the top ranked hypotheses remain below the threshold values, the system may iteratively generate event data using the time windows of greater length until a maximum window length is reached, with hypotheses from each iteration being tested.

Traditional systems for tracking inventory movement are intrusive and may interrupt a user's movement through a facility, require special tags on items, and so forth. For example, in a traditional warehouse situation a user has a device such as a handheld barcode scanner that is used every time an item is picked or placed to record the location and type of item involved. In another example, a radio frequency identification (RFID) tag may be affixed to each item and used to track the item. In the first example, the cost, inconvenience, and delay to the user is significant. Furthermore, each user must be equipped with a barcode scanner. In the second example, RFID tags and their placement can be costly, special devices may still need to be carried by the user, and precision as to a location of a particular item in the facility may be poorly defined.

In comparison, the system and techniques described herein provide significant technological improvements in tracking inventory movement within a facility. The use of the one or more weight sensors at an inventory location enables several aspects of the techniques described herein, including but not limited to the generation of the item weight model, the event location data, and so forth. The use of the weight sensors eliminates the need for a user to have to carry a device. This eliminates the cost associated with maintaining the device, eliminates the need for communication with the device thus sparing network bandwidth, and improves overall system operation by removing manual operations associated with scanning by a user. Operation of the system is thus no longer constrained to the user manually manipulating a scanner, improving throughput of the facility. Overall precision as to where an interaction has occurred is significantly improved because the inventory locations, and the lanes or other subdivisions therein, may be monitored with specificity, regardless of whether a particular item has an RFID tag or not. This precision further improves the accuracy of the interaction data.

Overall operation of the inventory management system is further improved by using the techniques described herein. For example, computational efficiency is improved by using the event data, item weight model, event location data, constraint data, and so forth to limit the number of possible hypotheses that are considered. This reduces the amount of memory needed to operate the system, reduces the amount of computer processing resources consumed, and reduces latency of the system in processing the sensor data and producing interaction data.

Illustrative System

Figure 1B:
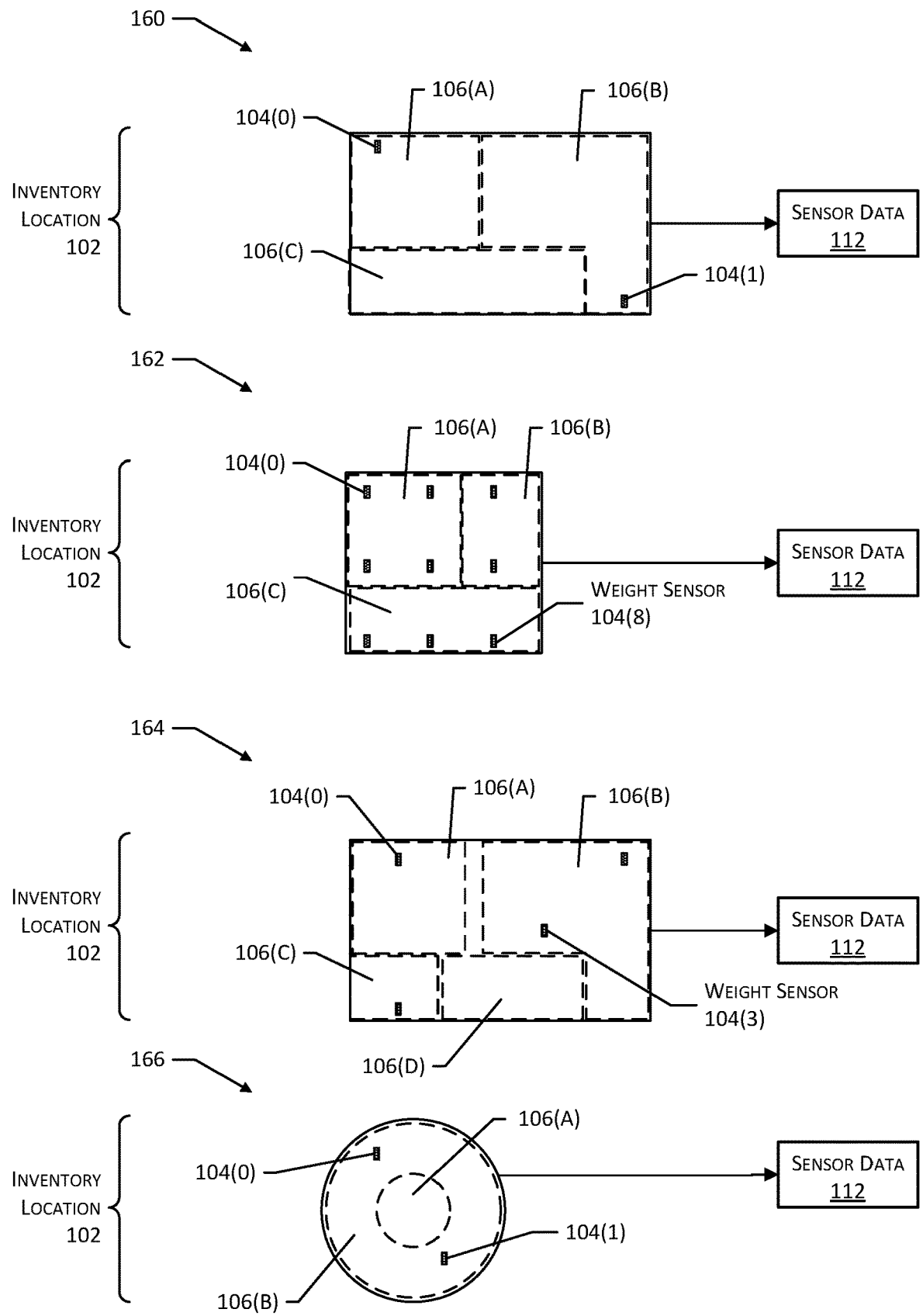

FIGS. 1A and 1B illustrate a system 100 to determine interaction data about the pick (removal) or place (return or loading) of items stowed at an inventory location based at least in part on sensor data obtained from one or more weight sensors, according to some implementations.

The inventory location 102 may comprise a platform that is equipped with one or more weight sensors 104. Each weight sensor 104 is configured to generate information indicative of a weight applied thereto. In other implementations, instead of or in addition to the platform, the inventory location 102 may comprise hangers, bins, or other apparatus to stow items.

The weight sensors 104 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 104 may operate as transducers that generate one or more signals based on an applied force, such as that of the load due to gravity. For example, the weight sensor 104 may comprise a load cell having a strain gauge and a structural member that deforms slightly when weight is applied. By measuring a change in the electrical characteristic of the strain gauge, such as capacitance or resistance, the weight may be determined. In another example, the weight sensor 104 may comprise a force sensing resistor (FSR). The FSR may comprise a resilient material that changes one or more electrical characteristics when compressed. For example, the electrical resistance of a particular portion of the FSR may decrease as the particular portion is compressed.

In one implementation depicted in FIG. 1A, weight on the platform is measured using four weight sensors 104(0), 104(1), 104(2), and 104(3). Each weight sensor 104 is near one of the four corners of the rectangular platform. For example, the weight sensor 104(0) is located near a rear left corner, while the weight sensor 104(3) is located near a rear right corner. In other implementations such as those depicted in FIG. 1B, other arrangements of weight sensors 104 may be utilized.

The platform may be divided into one or more areas 106. The areas 106 are an area upon the platform that may be associated with one or more particular types of item 108. For example, in this illustration there are four areas 106(A), 106(B), 106(C), and 106(D) arranged as lanes on the platform. Area 106(A) may be associated with storing some quantity of item 108(A) such as cat food, while area 106(B) may be associated with storing some quantity of item 108(B) such as dog food, area 106(C) may be associated with storing some quantity of item 108(C) such as fish food, and area 106(D) may be associated with storing some quantity of item 108(D) such as hamster food. In some implementations, different types of item 108 may be stored within a single area 106. For example, a single area 106 may be used to store individual bottles of water and multi-packs of water.

A user 110 may interact with the items 108 at the areas 106. For example, the user 110 may remove item 108(D) from the area 106(D). The user 110 may then return the item 108(D) to the area 106(D). Several users 110 may interact with the inventory location.

During operation, the weight sensors 104 produce sensor data 112. In one implementation the weight sensors 104 may produce analog signals that are subsequently converted into the sensor data 112 that is a digital representation of the analog signals. The sensor data 112 may be provided to an inventory management system 114.

The inventory management system 114 may be configured, as described below, to perform various functions with regard to a facility, including but not limited to tracking movement of items 108, determining quantity on hand of items 108, and so forth.

The sensor data 112 provided by the weight sensors 104 may contain noise. For example, vibrations in the ambient environment, perturbation of the platform during use, electrical noise, and so forth may result in noisy sensor data 112. A signal conditioning module 116 is configured to process the sensor data 112 and produce denoised data 118. The signal conditioning module 116 may process the sensor data 112 from each weight sensor 104 using a uniform moving kernel. In each moving window, a comparison is made of a mean value of a left half and a right half in the kernel. This comparison is used to determine whether a local constant or step function best fits the window based on a norm of estimated errors. The denoised data 118 may then comprise an estimate that is obtained by calculating a weighted average of local step fits from each window in which the weights are determined by a moving variance within the left- and right halves in the kernel. This penalizes local estimates with incorrect step fits.

In one implementation, the signal conditioning module 116 may determine a first mean for a first portion of a first set of data points of a signal in the sensor data 112. A second mean is calculated for a second portion of the first set of data points. A difference between the first mean and the second mean is compared to a first threshold. Based at least in part on the comparison, a first value equal to the first mean is assigned to each data point of the first portion of the first set of data points. Based at least in part on the comparison, a second value equal to the second mean is assigned to each data point of the second portion of the first set of data points. The denoised data 118 is produced that is representative of a modified signal based at least in part on the first value assigned to each data point of the first portion of the first set of data points and the second value assigned to each data point of the second portion of the first set of data points. In one implementation, the signal conditioning module 116 may implement the signal processing techniques described in U.S. patent application Ser. No. 15/199,030 titled "Signal Processing Techniques" filed Jun. 30, 2016.

An event detection module 120 processes the denoised data 118 to produce event data 122. The event data 122 is indicative of weight changes represented by the denoised data 118 and may comprise information indicative of coarse events and one or more sub-events for the coarse events. The event data 122 may indicate one or more of a start time, end time, event duration, starting weight, ending weight, weight change, and so forth. The event detection module 120 may use a cumulative sum (CUSUM) technique to determine whether, in a particular time window, the denoised data 118 is indicative of a transition to an unstable state, remains unstable, or has transitioned to a stable state. One implementation of the event detection module 120 is discussed in more detail below at least with regard to FIG. 2. Operation of the event detection module 120 may include specifying one or more parameters. For example, a parameter value may be used to specify a length of a time window used by the CUSUM technique to generate the event data 122. Event data 122 is discussed in more detail below at least with regard to FIGS. 3 and 4.

The weight of items 108 may vary. Variations in weight may result from differences in manufacture, the packaging process, and so forth. For example, the weight of bottles of water may be reasonably consistent with a variation in weight of less than 5% from bottle to bottle. Continuing the example, the weight of individual pre-packaged sandwiches may vary by 25% or more due to variations in preparation of the sandwich. In order to more accurately determine what items 108 have been picked from or placed to an inventory location 102, additional information about the weight of items 108 may be used.

An item weight learning module 124 uses a subset of event data 122 to generate an item weight model 126. For example, the event data 122 may be filtered to find those events involving pick or placement of individual ones of a particular type of item 108 from the inventory location 102. The weight changes associated with the event data 122 for each of these events may be used to construct the item weight model 126. For example, when the user 110 picks item 108(D) from area 106(D), the weight change indicated by the event data 122 is added to the set of data used to generate the item weight model 126. In one implementation the item weight model 126 for a particular type of item may comprise a probability distribution function in which, given an input of a left weight change as measured at a left side of an inventory location 102 and a right weight change as measured at a right side of the inventory location 102, a confidence value is output that indicates a likelihood that those particular weights are associated with the type of item 108. The item weight model 126 may be specific to a particular type of item 108 that is associated with a particular area 106. For example, if the same type of item 108 is stowed at different areas 106 on the same platform, each area may have a different item weight model 126. Operation of the item weight learning module 124 is discussed in more detail below at least with regard to FIG. 5.

An inference module 128 uses the event data 122, the item weight models 126, item data 130, and physical layout data 132 to generate and assess a first set of event hypotheses 134. The item data 130 comprises information about a particular type of item 108. The item data 130 may include information indicative of a weight of a single item 108, or a package, kit, or other grouping considered to be a single item 108. The item data 130 may include other characteristics of that type of item 108 such as: physical dimensions, characteristics about how the item 108 appears, and so forth. The item data 130 may indicate the types and quantities of items 108 that are expected to be stored at a particular area 106 at a particular inventory location 102. The item data 130 may include other data. For example, the other data may comprise weight distribution of the item 108, and so forth.

The physical layout data 132 may provide information indicative of where inventory locations 102 are in the facility, location of sensors, information about sensor orientation and field of view (where applicable), and so forth. For example, the physical layout data 132 may comprise information representative of a map or floor plan of the facility with relative positions of inventory locations 102. In some implementations, the physical layout data 132 may include planogram data indicative of how types of items 108 are to be arranged at the inventory locations 102, location of the areas 106, and so forth. For example, while the item data 130 may indicate that item 108(D) is stowed in area 106(D), the physical layout data 132 may indicate that area 106(D) at the inventory location 102 comprises a rectangular area that extends 20 cm from a right edge of the platform and from front to back of the platform.

The physical layout data 132 may also comprise information about the type of inventory location 102 in use, information indicative of the physical configuration or placement of weight sensors 104 at a particular inventory location 102, and so forth. For example, the physical layout data 132 may indicate that a particular model of multi-load cell weighing shelf is in use at a particular inventory location 102. Using this information, data about the relative position of the load cells with respect to the shelf may be retrieved.

Each hypothesis in the first set of event hypotheses 134 may indicate a particular inventory location 102 or portion thereof such as an area 106, a type of item 108, and a quantity of the type of item 108. Hypotheses may be generated for particular events, such as one or more of coarse events or sub-events. A particular event indicated by the event data 122 may have one or more hypotheses in the first set of event hypotheses 134. In some implementations, the first set of event hypotheses 134 may be constrained based on hypothesis constraint data. The hypothesis constraint data may specify limitations associated with expected interactions within the inventory location 102. The constraints may include a maximum number of types of items per hypothesis, a maximum quantity per type of item per hypothesis, a maximum length of time for a coarse event, a minimum length of time for a sub-event, a maximum number of interactions per hypothesis, and so forth. For example, the hypothesis constraint data may specify that a particular hypothesis cannot include more than five types of items, that a coarse event can be no longer than 300 seconds, and so forth.

A first confidence value is generated for each hypothesis in the first set of event hypotheses 134. For example, the confidence value may be determined by using the item weight model 126 for a particular type of item and the weight change indicated by the event data 122 for a particular event. In one implementation, the event data 122 is processed to determine a left weight change by summing the weight changes of the weight sensors 104(0) and 104(1) on the left of the inventory location 102 and a right weight change determined by summing the weight changes of the weight sensors 104(2) and 104(3). The left weight change and right weight change from the event data 122 may then be input to the item weight model 126 for a particular type of item 108 that is indicated by a particular hypothesis, and the first confidence value for that particular hypothesis is determined.

The hypotheses in the first set of event hypotheses 134 may then be ranked by the first confidence value. The first confidence value of a top ranked hypothesis may be compared to the next ranked hypothesis. If a difference in the first confidence values of the top ranked and next ranked hypotheses is greater than a threshold value, the top ranked hypothesis may be deemed representative of the interaction. The system may then use the top ranked hypothesis to generate interaction data 148. In other implementations, other comparisons may be made instead of, or in addition to, the difference. For example, if the top ranked hypothesis has a first confidence value greater than a threshold value, it may be deemed suitable for use in generating the interaction data 148. Operation of the inference module 128 is discussed in more detail below at least with regard to FIGS. 6-8 and 12A-12C.

In some implementations, the confidence values of the hypotheses in the first set of event hypotheses 134 may be unable to meet the specified thresholds. For example, several hypotheses may have confidence values that are very close in value to one another. The system may proceed to use an event vector generation module 136 to determine event location data 138. The event location data 138 is indicative of a physical location with respect to the inventory location 102 at which the event has taken place. As items 108 are picked from or placed to the inventory location 102, the center of gravity of the platform changes. The change in the center of gravity may be calculated based on the weight changes at each of the weight sensors 104, given the known physical configuration of the inventory location 102 and the position of the weight sensors 104. The event location data 138 may specify a time associated with the event and a one-dimensional coordinate of the event, such as a point at a particular distance along an X axis, or a two-dimensional coordinate such as a point along the X axis and a perpendicular Y axis. In some implementations the event location data 138 may indicate a particular area 106. For example, the coordinate along an X axis of the event may be compared to the physical layout data 132 that relates the physical configuration of the areas 106 at the inventory location 102. If the coordinate indicates a position within a particular area 106, then the event location data 138 may specify that particular area 106. In some implementations, the event location data 138 may be expressed as vectors, each associated with a particular time.

The event location data 138 may then be used to re-rank or filter the first set of event hypotheses 134. For example, for each hypothesis in the first set of event hypotheses 134, a correspondence value may be determined that indicates a correspondence between the particular area 106 at the particular inventory location 102 indicated by the hypothesis and the event location data 138. A second confidence value for a particular hypothesis may be determined based on the first confidence value and the correspondence value. The hypotheses in the first set of event hypotheses 134 may be re-ranked in a second ranking based on their respective second confidence values.

The second confidence value of the top ranked hypothesis may be compared to the next ranked hypothesis. If a difference in the second confidence values of the top ranked and next ranked hypotheses is greater than a threshold value, the top ranked hypothesis may be deemed representative of the interaction. The system may then use the top ranked hypothesis to generate the interaction data 148. In other implementations other comparisons may be made instead of, or in addition to, the difference. For example, if the top ranked hypothesis has a second confidence value greater than a threshold value, it may be deemed suitable for use in generating the interaction data 148. The event vector generation module 136 and the event location data 138 are discussed below with regard to at least FIG. 9.

In some implementations, the confidence values of the hypotheses in the first set of event hypotheses 134 may be unable to meet the specified thresholds. The system may then utilize the hierarchical event analysis (HEA) module 140. As described above, the event data 122 may be explained by several possible hypotheses. The HEA module 140 operates to try and disambiguate between these hypotheses using several techniques. The top ranked hypotheses for all sub-events are aggregated and compared with their counterpart hypothesis for the coarse event. If there is agreement between these top ranked hypotheses and the hypothesis for the coarse event, these hypotheses may be used to determine the interaction data 148. For example, if the coarse event hypothesis indicates a removal of one item 108 from area 106(D), and the sub-events indicate various picks and places of items 108 from area 106(D) that sum to −1, the two are considered to agree. If the hypotheses disagree, then the HEA module 140 may generate a second set of event data 122 by merging two or more of the sub-events present in the first set of event data 122.

In one implementation, the HEA module 140 may merge the first sub-event (as indicated by start time) with the second sub-event, to create a single sub-event. In another implementation, the HEA module 140 may determine a top two shortest sub-events that are adjacent in time to one another, and merge those two shortest adjacent sub-events. In other implementations, other merger strategies may be used. Once merged, the HEA module 140 may proceed to iterate through the process implemented by the modules above. For example, the inference module 128 may be used to process the second set of event data 122 and generate a second set of event hypotheses 142 that are then evaluated as described above. The HEA module 140 may iterate, merging sub-events, stopping when the confidence values of the hypotheses meet the threshold requirements, or when all of the sub-events have been merged into a single event that corresponds to the coarse event. If, after iterating, the HEA module 140 is unable to generate hypotheses that meet the threshold requirements, the process may utilize the fine grained analysis (FGA) module 144.

The FGA module 144 generates third event data 122 by processing the denoised data 118 using various different durations of time windows. For example, during the initial pass to generate the first set of event data 122, the event detection module 120 may use a time window of 100 ms. The FGA module 144 may begin to increase the length of that time window during subsequent iterations. Continuing the example, the FGA module 144 may set the event detection module 120 to use a time window of 250 ms during an iteration. This produces the third set of event data 122 which may then be processed as determined above. The FGA module 144 may then process the third set of event data 122 and generate a third set of event hypotheses 146. If no hypotheses are generated that meet the threshold requirements, the FGA module 144 may again increase the duration of the time window, and use the event detection module 120 to create new event data 122, and the process proceeds. The iteration of the FGA module 144 may stop when either one or more hypotheses meet the threshold requirements or a maximum time window length is reached. The FGA module 144 may then produce the interaction data 148 based on the highest ranked hypothesis available. This may result in interaction data 148 with a high confidence value, such as resulting from hypotheses with high confidence values, or a low confidence value. If the interaction data 148 is deemed to have a low confidence value, it may be further processed using another system or manual intervention. The FGA module 144 is discussed in more detail below at least with regard to FIGS. 11 and 12A-12C.

The interaction data 148 may include information about the type of item 108 involved, quantity involved, whether the interaction was a pick or place, and so forth. The interaction data 148 may include time information indicative of when the interaction took place. Interactions may include the user 110 picking an item 108 from an inventory location 102, placing an item 108 at an inventory location 102, touching an item 108, rummaging through items at the inventory location 102, and so forth.

The inventory management system 114 is thus able to use the sensor data 112 obtained by the weight sensors 104 at the inventory location 102 to determine the interaction data 148. The interaction data 148 may be used to determine what items 108 the user 110 has in their custody. For example, as the user 110 picks items from the inventory locations 102 in the facility and carries them or places them in a tote, the inventory management system 114 maintains a list of those items and their quantities. If the user 110 places an item 108 onto an inventory location 102, that item 108 may be removed from the list. In some implementations, after the user 110 leaves the facility, the list may be used to generate an invoice, bill a previously associated account, and so forth. The interaction data 148 may also be used to maintain information about the quantity on hand of the items 108 in the facility. Continuing the example, as the user 110 picks and places various types of item 108, quantity on hand for that type of item 108 at the particular areas 106 within particular inventory locations 102 may be updated.

As shown in FIG. 1B, the facility may utilize a variety of different inventory locations 102 with different arrangements of weight sensors 104, platform size, platform shape, and so forth. At 160 one implementation of an inventory location 102 is shown in which a first weight sensor 104(0) is positioned proximate to a first corner of a rectangular platform while a second weight sensor 104(1) is positioned proximate to a second corner that is diagonally opposite the first corner. This inventory location 102 is depicted with three areas 106(A), 106(B), and 106(C) of varying shapes and sizes.

At 162 another implementation of an inventory location 102 is shown in which nine weight sensors 104(0)-104(8) are located at various positions with respect to a square platform. The weight sensors 104(0)-104(8) are arranged in a regular grid array that is symmetrically positioned with regard to the platform. This inventory location 102 is depicted with three areas 106(A), 106(B), and 106(C) of varying sizes.

At 164 another implementation of an inventory location 102 is shown in which four weight sensors 104(0)-104(3) are located at various positions with respect to the rectangular platform. As shown here, the plurality of weight sensors 104 may be asymmetrically arranged with respect to the platform. In some implementations, a minimum distance "d" may separate adjacent weight sensors 104. This inventory location 102 is depicted with four areas 106(A), 106(B), 106(C), and 106(D) of varying shapes and sizes. For example, area 106(B) is approximately "L" shaped.

At 166 another implementation of an inventory location 102 is shown. In this implementation, the platform is circular, and two weight sensors 104(0) and 104(1) are separated from one another by at least a minimum distance. This inventory location 102 has two areas including a central circular area 106(A) and an annular area 106(B) that surrounds the central circular area 106(A).

In other implementations, other types of inventory location 102 may utilize the techniques described herein. For example, the inventory location 102 may comprise a structure to which a plurality of hangers, bins, platforms, and so forth are attached.

The use of the weight sensors 104 in this disclosure allows for more efficient and effective tracking of items 108 within a facility. As mentioned above, the system is able to operate based on an intrinsic characteristic of the item 108, the weight. This allows the system to readily and quickly adapt to the handling of new or different types of items 108. The use of the system and associated techniques described above allow for a highly accurate and automated determination of the movement and disposition of items 108 in the facility.

Figure 2:
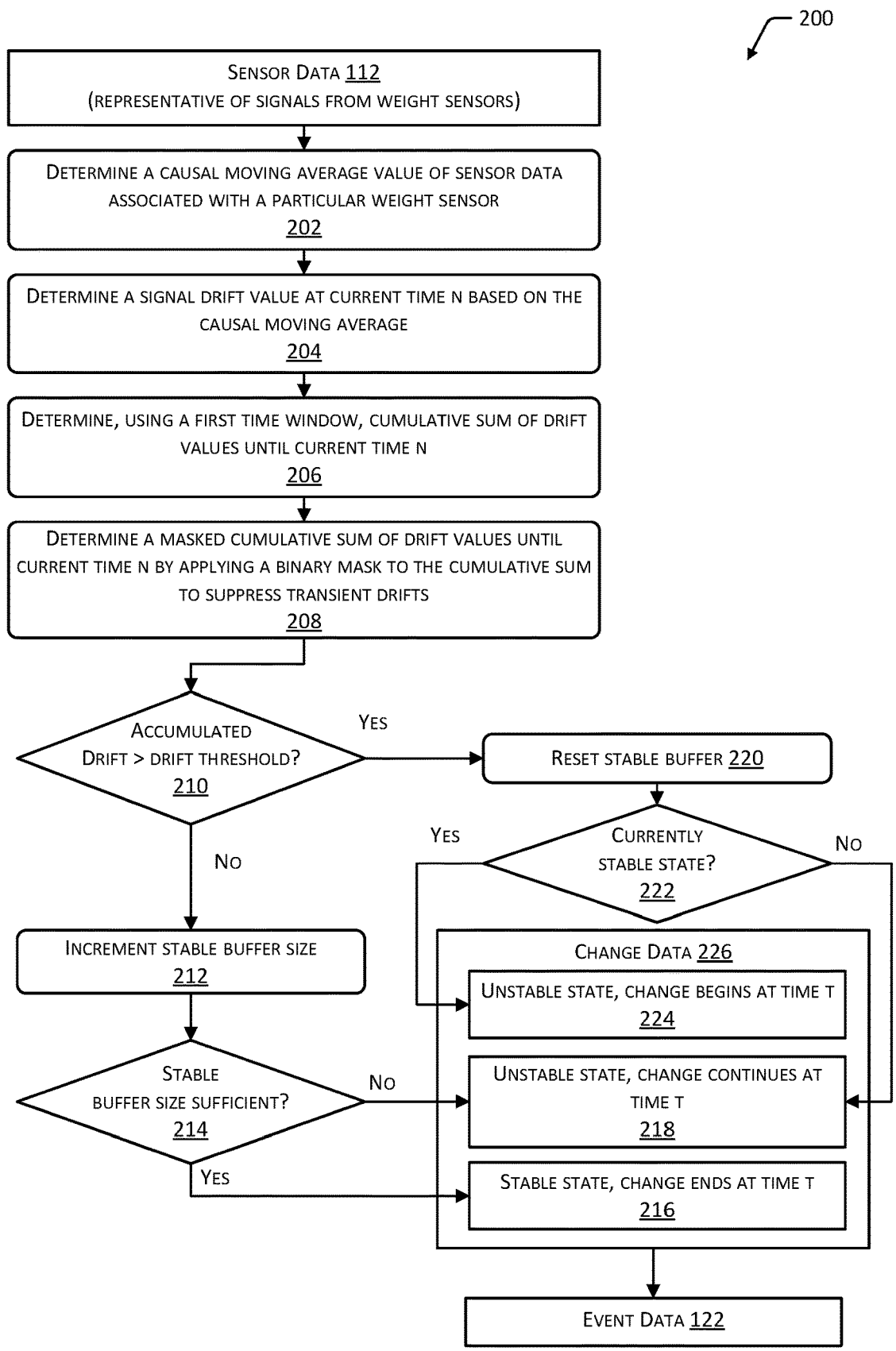
FIG. 2 illustrates a flow diagram of a process to determine event data, according to some implementations.

FIG. 2 illustrates a flow diagram 200 of a process to determine the event data 122, according to some implementations. The process may be implemented at least in part by the event detection module 120 executing on one or more computing devices. It is desirable for the event data 122 to avoid incorrectly asserting that an event has ended while the user 110 is still interacting with the inventory location 102. This incorrect assertion reduces the overall accuracy of the system, and increases consumption of resources such as memory and processor usage.

The process described utilizes a vectorized form of a cumulative sum (CUSUM) technique in which the denoised data 118 from the plurality of weight sensors 104 at the inventory location 102 is used to determine if the system is stable with respect to a slope along the x and y dimensions of the inventory location 102, in addition to a sum of the channels representing the total weight experienced by the inventory location 102 during an interaction. By considering the denoised data 118 from the individual weight sensors in addition to a scalar total weight change, the system is less likely to incorrectly indicate a stable condition while an interaction is ongoing. A minimum buffer period is also used to minimize erroneous indications due to transient stabilizations. For example, the system may wait for a minimum buffer period of at least one second of stability before determining that an event has ended.

At 202, a causal moving average value of the sensor data 112 associated with a particular weight sensor 104 is determined. At 204, a signal drift value at a current time n is determined based on the causal moving average. At 206, a cumulative sum of drifts is determined using a first time window that extends until the current time n. For example, a first parameter value may specify the duration in milliseconds of the first time window. At 208, a masked cumulative sum of drift values until the current time n is determined by applying a binary mask to the cumulative sum. The binary mask suppresses transient drifts within an expected range.

At 210, a determination is made as to whether accumulated drift is greater than a drift threshold. If no, the process proceeds to 212. At 212, a stable buffer size is incremented and the process proceeds to 214. The stable buffer size specifies a minimum time for which the signal needs to be stable in order to assert that an event has ended. In one implementation, the minimum stable buffer size may be one second.

At 214, a determination is made as to whether the stable buffer size is sufficient. If yes, the process proceeds to 216 in which change data 226 is generated that is indicative of a stable state in which a change in the weight as measured by the weight sensor 104 ends at time t. Returning to 214, if no, the process proceeds to 218 in which change data 226 is generated that is indicative of an unstable state with continued change in the weight at time t.

Returning to 210, if the accumulated drift is greater than the drift threshold, the process proceeds to 220. At 220, the stable buffer is reset and the process proceeds to 222. At 222, a determination is made as to whether the data is currently in a stable state. If yes, the process proceeds to 224 in which change data 226 is generated that is indicative of an unstable state with a change in the weight as measured by the weight sensor 104 begins at time t. If no, the process proceeds to 218.

The change data 226 may then be used to generate the event data 122. For example, the change data 226 may be indicative of a first time at which the signal transitioned from a stable state to an unstable state, and a second time at which the signal transitioned from an unstable state to a stable state. The times indicated by the change data 226 are used to determine the denoised data 118 associated with the change, to generate event data 122 that indicates particular times and weights associated with those particular times.

In some implementations the process may operate using multiple buffers. A first buffer may be used to detect coarse events and have a duration that is greater than a second buffer that is used to detect sub-events within the coarse event.

In other implementations, other techniques may be used to generate the event data 122.

Figure 3:
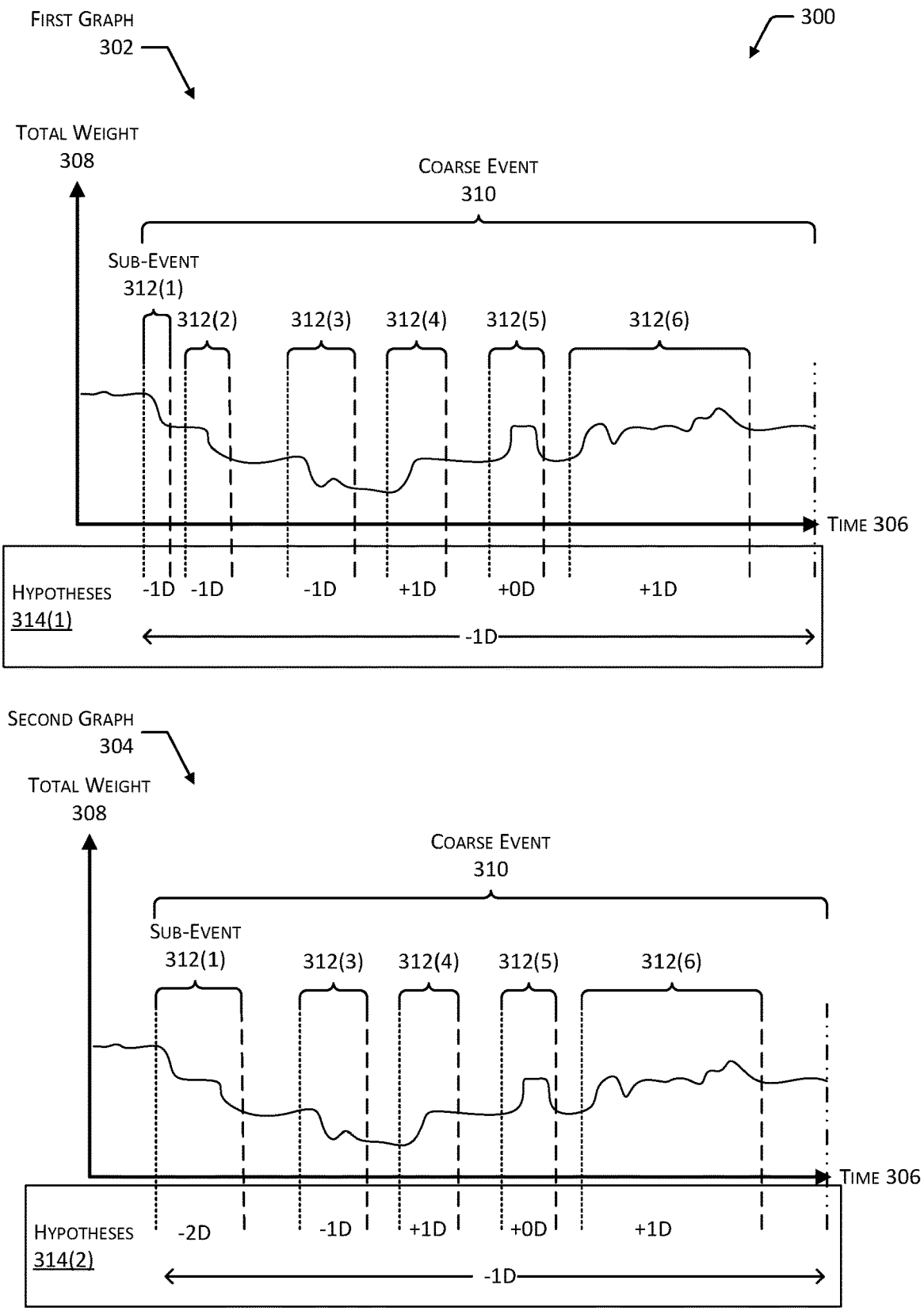
FIG. 3 illustrates coarse events and sub-events based on changes in weight as well as the merger of two adjacent sub-events, according to some implementations.

FIG. 3 illustrates graphs 300 of coarse events and sub-events based on changes in weight as well as the merger of two adjacent sub-events, according to some implementations. A first graph 302 depicts a first set of event data 122(1) determined by the event detection module 120 using the first time window. In this illustration, time 306 is indicated on a horizontal axis, increasing to the right while total weight 308 measured at the inventory location 102 is indicated on a vertical axis, increasing upwards. A coarse event 310 has been determined that extends from a first time to a second time, and within the coarse event 310 are six sub-events 312(1)-312(6). Also shown are details of the potential hypotheses 314(1) associated with the coarse event 310 and the sub-events 312(1)-312(6). The hypotheses 314(1) indicate the times associated with these various sub-events and the possible nature of the interaction. For example, "−1D" indicates a pick of a quantity of one type of item 108(D), while "+1D" indicates a place of a quantity of one type of item 108(D). In the first graph 302, aggregate data indicative of a sum of the quantity changes for each type of item in the hypotheses for the sub-events 312 corresponds to a type of item and quantity associated with a hypothesis for the coarse event 310. For example, the sub-events 312 specify quantity changes of the type of item 108(D) of −1D, −1D, −1D, +1D, +0D, +1D" resulting in aggregate data of −1D. This corresponds with the coarse hypothesis depicted here which specifies −1D.

A second graph 304 depicts the second set of event data 122(2), such as produced by operation of the HEA module 140. In this graph, the first two sub-events 312(1) and 312(2) that are adjacent to one another in time have been merged to create a single event 312(1). As described above, during successive iterations, the HEA module 140 may merge sub-events 312. As a result of the merger, the hypotheses 314(2) associated with the second set of event data 122(2) differ from the hypotheses 314(1).

Figure 4:
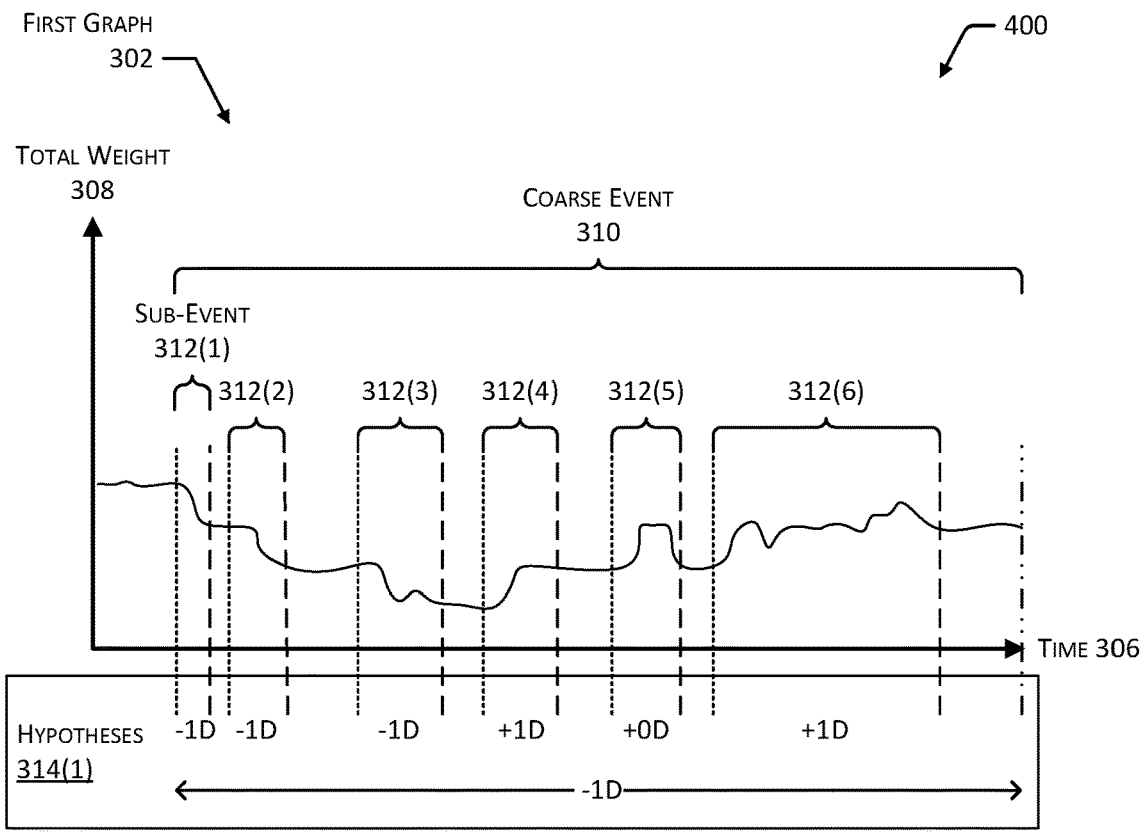
FIG. 4 illustrates coarse events and sub-events using different time windows in the process to determine the event data, according to some implementations.
Figure 4:
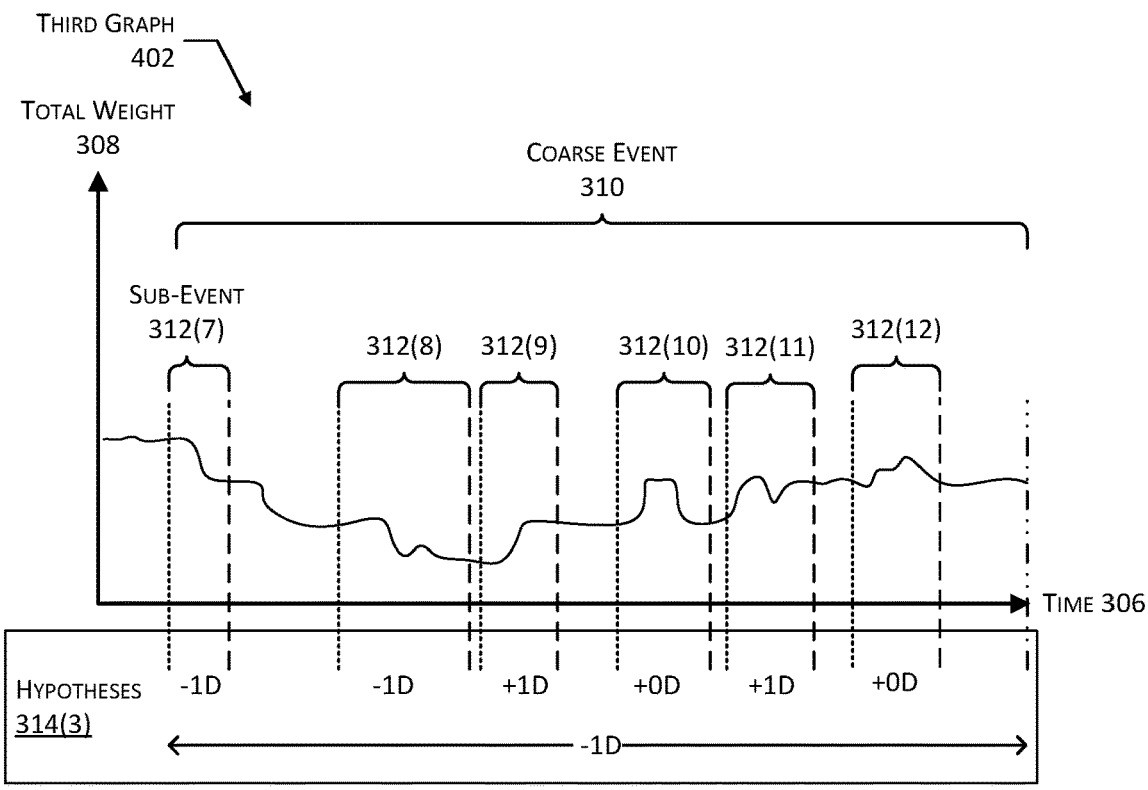

FIG. 4 illustrates graphs 400 of coarse events and sub-events using different time windows in the process to determine the event data 122, according to some implementations. In this figure, the first graph 302 is shown again with the first set of event data 122(1). As described above, the first set of event data 122(1) that is indicative of the coarse event 310 and the sub-events 312(1)-312(6) was determined by the event detection module 120 using a first time window.

A third graph 402 depicts the same denoised data 118 after being processed by the event detection module 120 using a second time window that is different from the first time window to produce third event data 122(3). For example, a second parameter value may specify the duration in milliseconds of the second time window. As described above, the FGA module 144 may operate the event detection module 120 to generate the third event data 122(3). The coarse event 310 is shown, as are the sub-events 312(7)-312(12). In this third event data 122(3) there are six sub-events 312 as in the first sub-events 312, but these sub-events 312 exhibit start and stop times that differ from those in the first set of event data 122(1). Also, the hypotheses 314(3) associated with the third event data 122(3) differ. For example, the sub-events 312 specify quantity changes of the type of item 108(D) of −1D, −1D, +1D, +0D, +1D, +0D" resulting in aggregate data of 0D, no net change. In comparison, the coarse hypothesis specifies a change of −1D. As a result, the aggregate data does not correspond to change specified in the coarse hypothesis.

Figure 5:
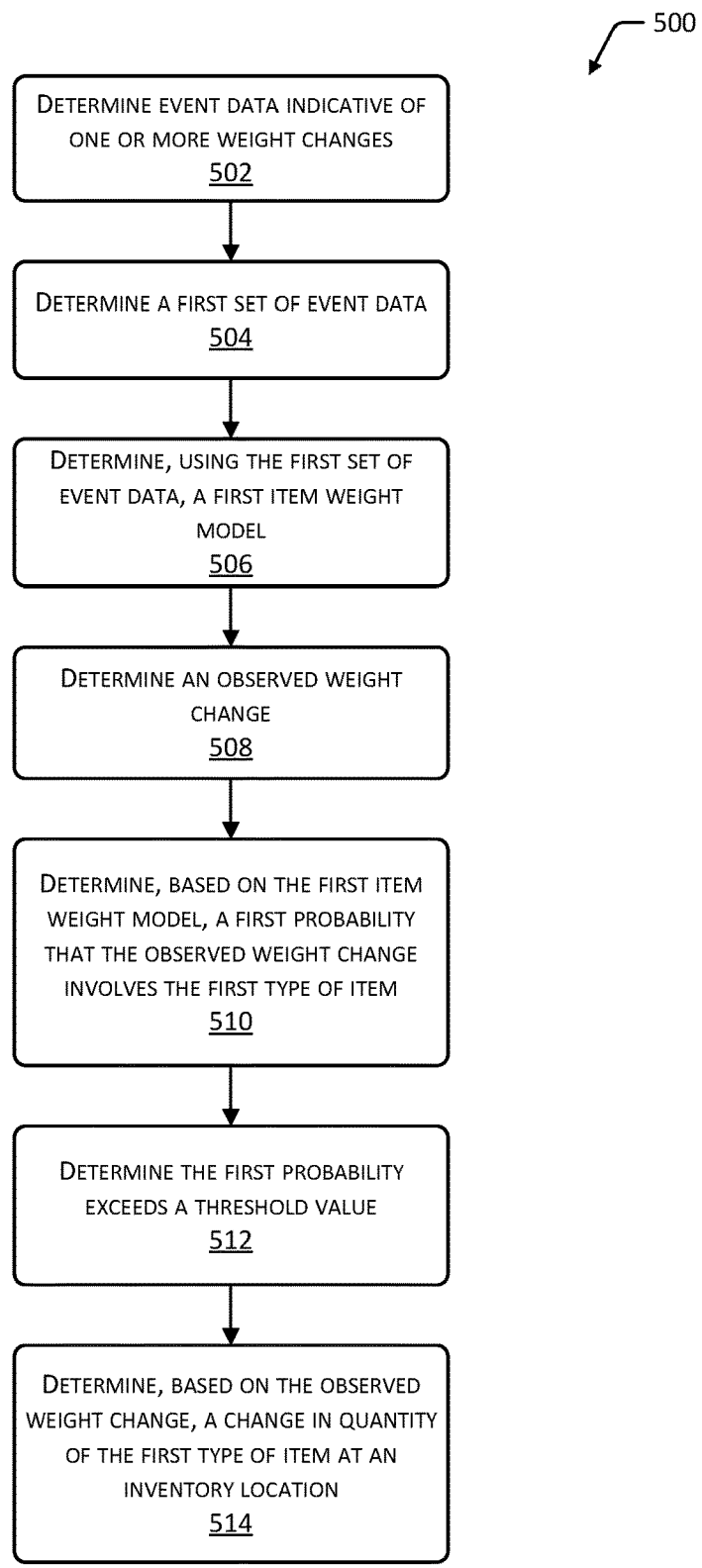
FIG. 5 illustrates a flow diagram of a process that uses a model which provides a probability that a weight is associated with a particular type of item to determine a change in quantity of the type of item, according to some implementations.

FIG. 5 illustrates a flow diagram 500 of a process that uses an item weight model 126 which provides a probability that a weight is associated with a particular type of item 108 to determine a change in quantity of the type of item 108, according to some implementations. The process may be implemented at least in part by the item weight learning module 124 executing on one or more computing devices.

At 502, event data 122 is determined that is indicative of one or more weight changes. For example, the event detection module 120 may determine event data 122 that indicates a sub-event 312 with an associated weight change.

At 504, a first set of event data 122 is determined. The first set of event data 122 may comprise historical data of weight changes associated with events involving a quantity of one of a single type of item 108. For example, the first set of event data 122 may comprise a subset of the event data 122 that has been previously determined. The first set of event data 122 may comprise those events that are associated with individual picks or places of a quantity of one of a single type of item 108. For example, during operation of the system, as the users 110 pick individual ones of item 108(D) from the inventory location 102 and place individual ones of item 108(D) back to the inventory location 102, a first set of event data 122 representative of these weight changes is determined. The first set of event data 122 may include multiple weight changes of the same item 108, such as when that same item 108 is picked and placed at various times. In some implementations, the first set of event data 122 may be limited to the most recent k values, where k is a non-zero integer value. For example, the first set of event data 122 may retain only the most recent one hundred (100) weight changes. In other implementations, the first set of event data 122 may be limited to weight changes that have occurred during a specified period of time, only to picks, only to places, and so forth.

In one implementation, the first set of event data 122 may be determined as follows. Based on output from the at least one weight sensor 104, event data 122 is determined that is indicative of a weight change at the inventory location 102. That weight change may be associated with a particular area of the platform, such as a particular area 106. A first confidence value is determined that is indicative of a likelihood that the event data 122 is representative of a pick or place of a single item. The first set of event data 122 is then determined that comprises a plurality of events indicated by the event data 122 having a first confidence value that is greater than a first threshold value and the weight change for each of the events in the plurality of event data 122 is deemed to be associated with a type of item 108 designated as being stowed in the particular area 106. In other implementations, other techniques may be used. For example, while items 108 are received at the facility, a sample of those items 108 may be weighed and those weights used to generate the first set of event data 122.

At 506, a first item weight model 126 is determined using the first set of event data 122. For example, the weight changes for each of the events in the first set of event data may be used to generate a probability distribution function (PDF). The PDF may be representative of a mixture distribution with a convex combination of the weight changes of each event in the first set of event data. The convex combination comprises a linear combination of points where all coefficients are non-negative and sum to 1. The probabilistic distribution of weights for the type of item 108 "i" may be represented as:

$$f_W^{(i)}(w) = \frac{\sum_{k=0}^{N-1} a[k] \cdot G(w - h^{(i)}[k])}{\sum_{l=0}^{N-1} a[l]} \qquad \text{EQUATION 1}$$

In equation 1, $w^{(i)}$ refers to the weight, $h^{(i)}[k]$ refers to the weight measurement from a k-th past event associated with that type of item 108, G refers to a Gaussian distribution corresponding to measurement noise, and a[k] refers to a non-negative weighing factor applied to the k-th observation, and N denotes the number of weight measurements. In one interpretation, the mixture distribution may be represented as a smoothed form of a weighted histogram representative of historical weight samples of the type of item 108.

In some implementations, the non-negative weighing factor may be based on data indicative of a time the weight change was received. For example, the weight change may be associated with a sequence number, timestamp, memory location, and so forth. Continuing the example, the factor may be based on the timestamp. For example, the older the time stamp the smaller the value of the factor, while weight changes associated with younger timestamps are given larger factors. As a result, the equation gives older weight changes less consideration than newer weight changes.

The item weight model 126 may be used in a variety of ways, as discussed herein. In one implementation, at 508 an observed weight change may be determined. For example, the observed weight change may comprise a weight change associated with a particular coarse event 310 or sub-event 312. At 510, the first item weight model 126 may be used to determine a first probability that the observed weight change involves the first type of item 108.

In other implementations, other techniques may be used to generate the item weight model 126. For example, sample weights of a plurality of items of a type of item may be used as input to a classifier or neural network which has been trained to provide output indicative of a confidence value that the input weight corresponds to a particular type of item.

At 512, the first probability may be determined to exceed a threshold value. At 514, based on the observed weight change, a change in quantity of the first type of item 108 at the area 106 may be determined at the inventory location 102.

In some implementations, other actions may be performed responsive to the determined change in quantity. For example, based on previous quantity data and the change in quantity, a quantity on hand of the first type of item 108 as stowed at the inventory location 102 may be determined. If the quantity on hand is determined to be less than a threshold value, an order to restock the inventory location 102 may be generated.

Figure 6:
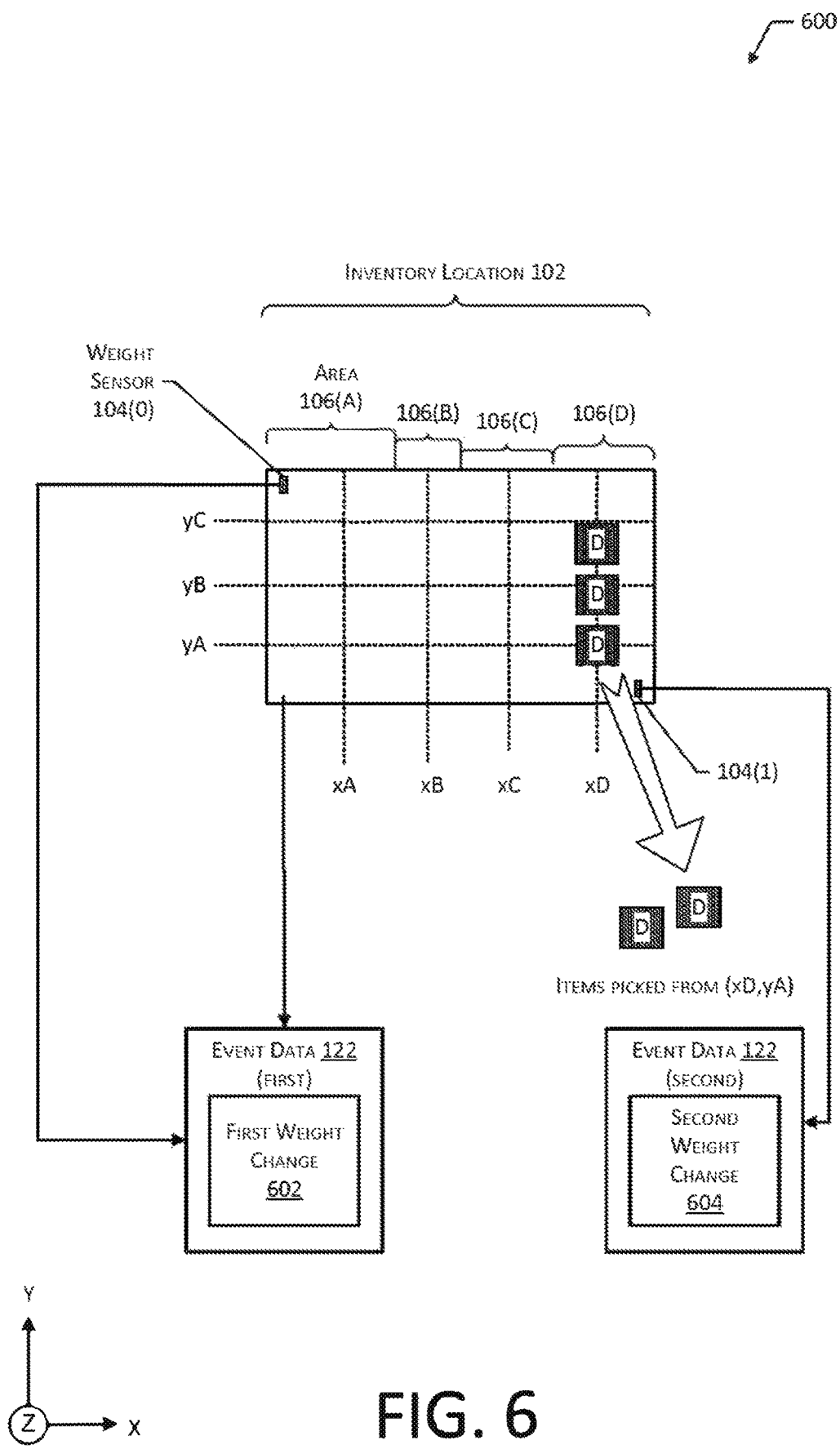
FIG. 6 depicts a pick of an item from an inventory location and the resulting left weight change and right weight change data, according to some implementations.

FIG. 6 depicts a scenario 600 of a pick of a quantity of two of items 108 from an inventory location 102, according to some implementations. In this scenario, the inventory location 102 is shown, with the four areas 106(A)-(D). A quantity of two of items 108(D) is picked from the area 106(D). As a result of this pick, the weight on the platform of the inventory location 102 that stows the items 108 changes. The platform is supported by two weight sensors 104(0)-(1). In this illustration, the event data 122 is determined based on the weight changes measured by each of the weight sensors 104. The event data 122 may be processed to determine event data 122 (first) that includes a first weight change 602 and event data 122 (second) that includes a second weight change 604. For example, the first weight change 602 may comprise a sum of the weight changes of the event that were measured by weight sensors 104(0) and 104(1). Likewise, the second weight change 604 may comprise a sum of the weight changes of the event that were measured by weight sensors 104(0) and 104(1).

In the implementations depicted here, the areas 106 comprise lanes on the surface of the platform of the inventory location 102. The item data 130 and the physical layout data 132 provide information about what types of items 108 are designated as being stowed in the particular areas 106, and the physical configuration of the areas 106. The physical layout data 132 also provides information about the physical configuration or position of the weight sensors 104 with respect to the platform. The first weight change 602 and the second weight change 604 of an event may be used as inputs to an item weight model 126 as described next.

Figure 7:
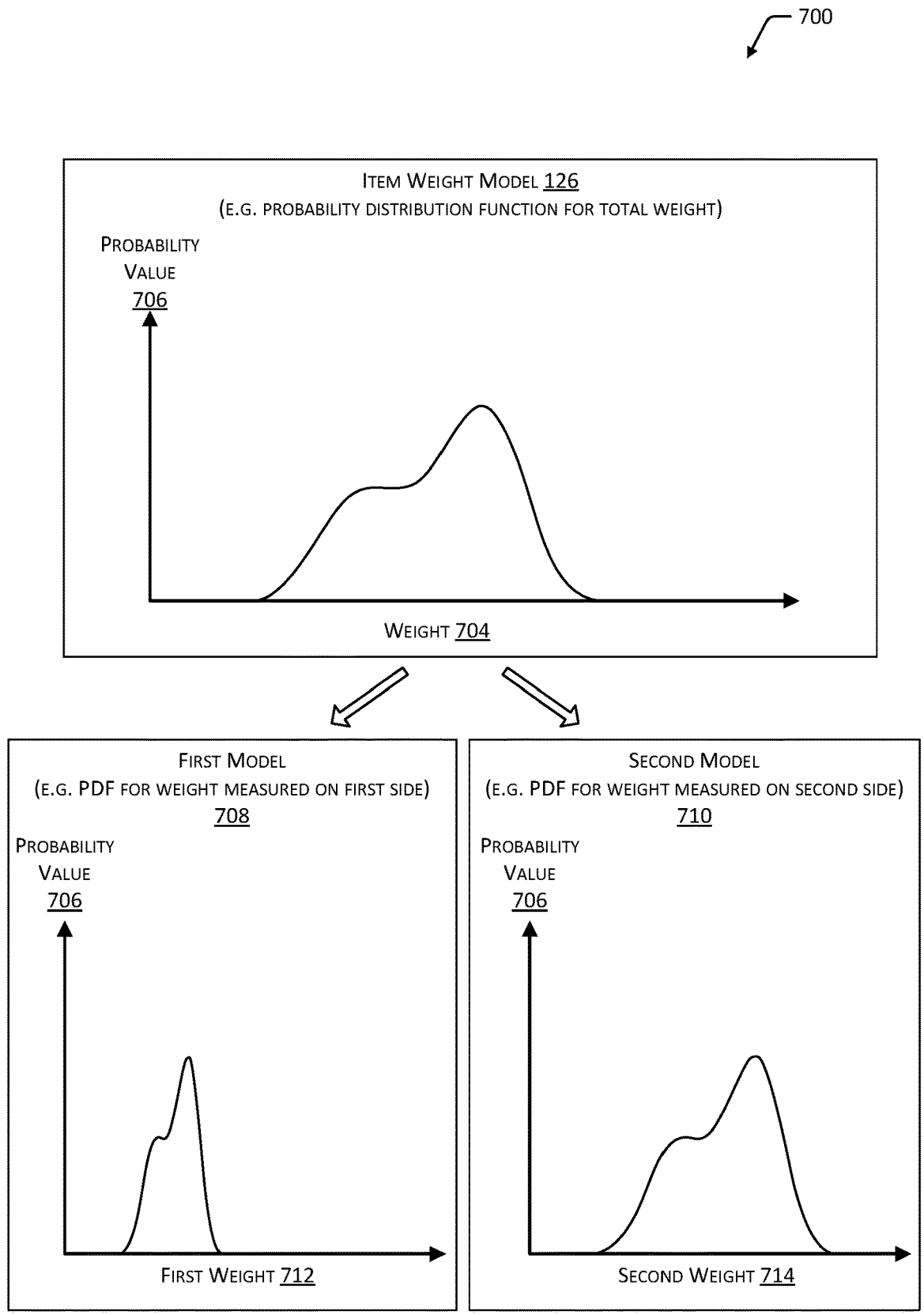
FIG. 7 depicts graphs of item weight models that provide a probability value that a particular weight change is associated with a particular type of item, including models that are specific to changes in weight at a first side and a second side of an inventory location, according to some implementations.

FIG. 7 depicts graphs 700 of several types of item weight models 126. An item weight model 126 is depicted. As described above, the item weight model 126 may be determined by the item weight learning module 124 as described above using a set of weight changes associated with picks and places of single ones of a particular type of item 108. The item weight model 126 depicted provides a relationship between a weight 704, indicated along a horizontal axis, with a probability value 706, indicated along a vertical axis. As described above, the item weight model 126 may comprise a probability distribution function that provides a probability value that a particular weight value is associated with a particular type of item 108.

The item weight learning module 124 or other modules may be configured to use an item weight model 126 and other information such as the item data 130 and the physical layout data 132 to determine, as described next, a first model 708 and a second model 710. The first model 708 may indicate a first weight 712 along a horizontal axis and the probability value 706 along the vertical axis. The second model 710 may indicate a second weight 714 along a horizontal axis and the probability value 706 along the vertical axis.

The proportion of weight experienced by an item 108 being placed at an area 106 at the inventory location 102 at the left and right weight sensors 104 can be determined as follows:

$$w_L^{(i)} = \left(\frac{x_R - x^{(i)}}{x_R - x_L}\right) w^{(i)} \qquad \text{EQUATION 2}$$

$$w_R^{(i)} = \left(\frac{x^{(i)} - x_L}{x_R - x_L}\right) w^{(i)} \qquad \text{EQUATION 3}$$

In equations 2 and 3 $x_L$ specifies a location along an x axis (left to right along the inventory location 102) of the left weight sensors 104(0) and 104(1) and $x_R$ specifies a location along the x axis of the right weight sensors 104(2) and 104(3). Also in these equations, the i-th area 106 at the inventory location 102 at the x-location is designated $x^{(i)}$, and an item 108 weight is designated as $w^{(i)}$.

Based on the relationship expressed in equations 2 and 3, in one implementation the first model 708 and the second model 710 may be derived using the following equations:

$$f_{W_L}^{(i)}(w_L) = f_W^{(i)}\left(\left(\frac{x_R - x_L}{x_R - x^{(i)}}\right)w_L\right)\left|\frac{x_R - x_L}{x_R - x^{(i)}}\right| \qquad \text{EQUATION 4}$$

$$f_{W_R}^{(i)}(w_R) = f_W^{(i)}\left(\left(\frac{x_R - x_L}{x^{(i)} - x_L}\right)w_L\right)\left|\frac{x_R - x_L}{x^{(i)} - x_L}\right| \qquad \text{EQUATION 5}$$

In equations 4 and 5, $f_W^{(i)}$ represents the product distribution function for weight of a particular type of item 108. This relationship may then be used to determine a joint probability distribution of the left and right weights expected for the area 106 using Bayes' theorem of probability as:

$$f_{W_L,W_R}^{(i)}(w_L, w_R) = f_{W_L}^{(i)}(w_L) \cdot f_{W_R|W_L}^{(i)}(w_R|w_L)$$

$$= f_{W_R}^{(i)}(w_R) \cdot f_{W_L|W_R}^{(i)}(w_L|w_R) \qquad \text{EQUATION 6}$$

The joint probability distribution of the left and right weights for a plurality of different types of items 108 may then be used to construct the combined hypotheses model discussed next.

Figure 8:
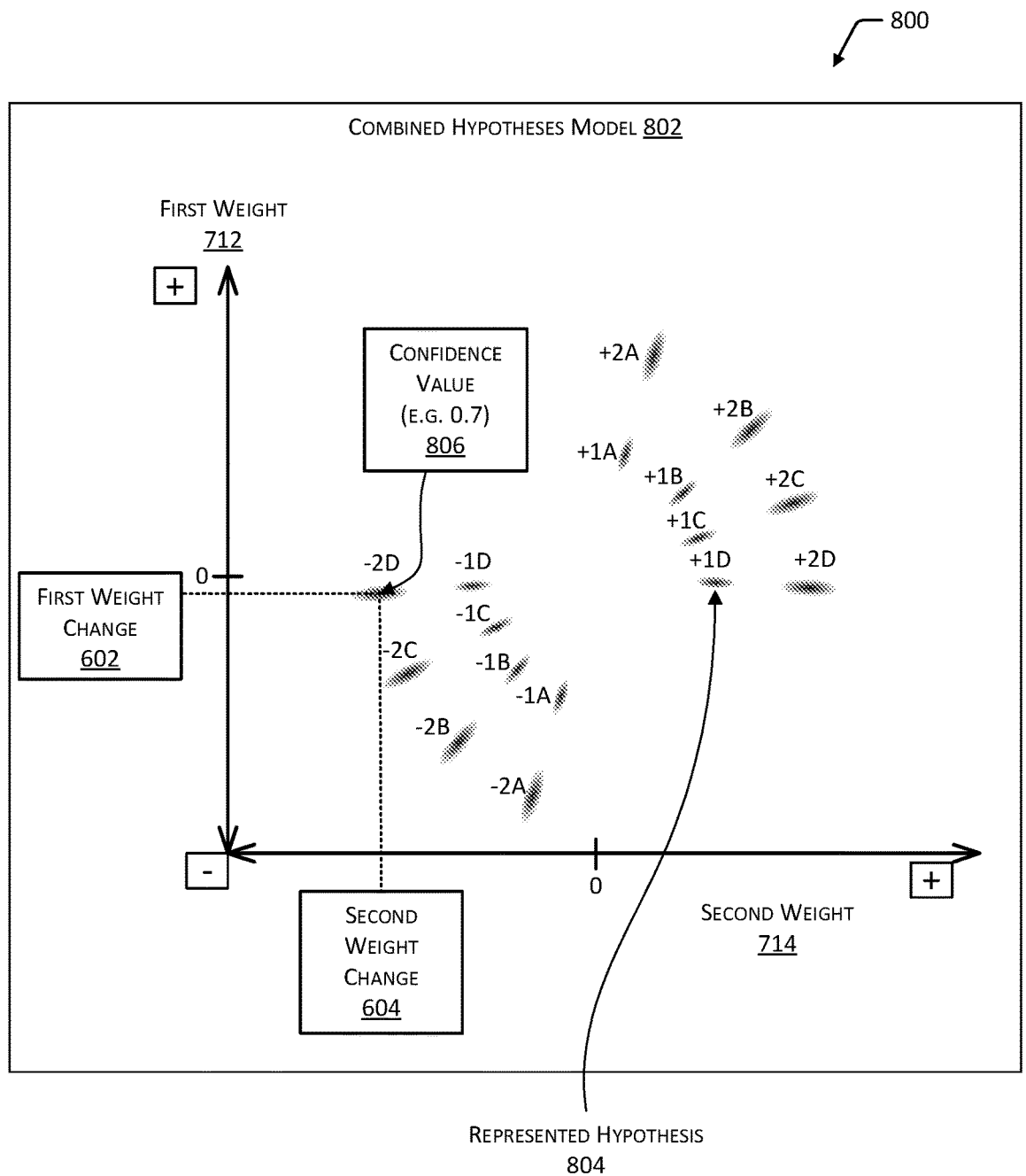
FIG. 8 depicts a combined hypotheses model that relates, for a particular first weight change and second weight change, a probability that the change in weight is associated with a particular type of item and the quantity of that type of item, according to some implementations.

FIG. 8 depicts a graph 800 of a combined hypotheses model 802 that is based on a joint probability distribution of the first and second weights as expressed by the first model 708 and the second model 710 for a plurality of different types of items 108. The combined hypotheses model 802 may be representative of hypotheses associated with a particular inventory location, such as a specific platform. For example, each hypothesis is representative of a specific quantity change of a specific type of item at a specific area on the specific platform. For each hypothesis, a first model 708 and a second model 710 may be determined as described above with regard to FIG. 7. The combined hypotheses model 802 comprises a plurality of models.

In this graph 800 a vertical axis is indicative of a first weight 712 that corresponds to a weight change of the respective first models 708 and a horizontal axis is indicative of a second weight 714 that corresponds to a weight change of the respective second models 710.

Within the graph 800 the relative intensity of the shading indicates an increasing probability, with white indicating a low probability and black indicating a high probability. A represented hypothesis 804 appears as a patch in this graph 800. Information about the represented hypothesis 804 is indicated by the adjacent label. For example, "+1" indicates a placement of one of the type of item 108 associated with that represented hypothesis 804. The represented hypothesis 804 is associated with a particular area 106 and type of item 108 stowed therein. As described above, each represented hypothesis 804 is described by a corresponding first model 708 and second model 710. For example, 16 represented hypotheses 804 are depicted in FIG. 8, with each hypothesis having a respective first model 708 and a second model 710.

The confidence values of models depicted here that involve a single quantity, such as a +1 place or a −1 pick may exhibit a relatively localized area in this graph 800 as they are determined based on the weight changes involving individual ones of that type of item 108. The confidence values of hypotheses involving integer quantities of the type of item 108 may be determined by linearly convolving the single quantity model. Such convolution may result in models that begin to become less certain as the convolution is extended. For example, the models produced from convolution will exhibit a relatively larger localized area as the error associated as the number of convolutions grows. For example, the regions of non-zero confidence values on the graph 800 that are associated with quantities of "2" are larger than the regions of non-zero confidence values that are associated with quantities of "1", and a value of a local maxima of confidence value may decrease with each subsequent convolution. While models for item 108 quantities of two are depicted, it is understood that the single quantity model may be further convolved to produce a model indicative of any non-zero integer value of item 108 quantities, such as three, four, five, or more items 108.

The combined hypotheses model 802 may be used to determine a confidence value 806 or probabilistic value that a particular represented hypothesis 804 is associated with a particular event and the first weight change 602 and second weight change 604 of that event. For example, given the first weight change 602 and the second weight change 604 associated with a particular event, the resulting confidence value is 0.7 that the particular change in weight at the first side and second side of the inventory location 102 corresponds to the hypothesis of a pick of a quantity of 2 of the type of item 108(D) from the area 108(D).

By using this the combined hypotheses model 802, the inference module 128 is able to determine confidence values 806 for the respective hypotheses in a set of event hypotheses. The confidence values 806 may then be used for subsequent ranking and assessment of the hypotheses, as described herein.

In some situations, the hypotheses may exhibit confidence values 806 determined by the inference module 128 that are sufficient to select a particular hypothesis from the possible hypotheses in the set. For example, after ranking the hypotheses in the first set of event hypotheses 134, the top two hypotheses may have confidence values of 0.7 and 0.65, respectively. The selection of a particular hypothesis as being deemed confident enough for use in creating the interaction data 148 may be based on comparison to one or more thresholds. For example, if the hypothesis exhibits a confidence value 806 that is greater than a threshold value it may be deemed to be suitable for use to create the interaction data 148. In another example, if a difference between the confidence values 806 of the top two hypotheses is greater than a threshold value, the top ranked hypothesis may be deemed suitable for use to create the interaction data 148. In another example, the two may be combined, requiring a minimum confidence value 806 and a minimum difference in confidence value between the next closest hypothesis.

In some implementations, the combined hypotheses model 802 may include hypotheses that combine different types of items 108 involved in a simultaneous event, such as items 108(C) and 108(D) being picked at the same time as part of the same event.

Figure 9:
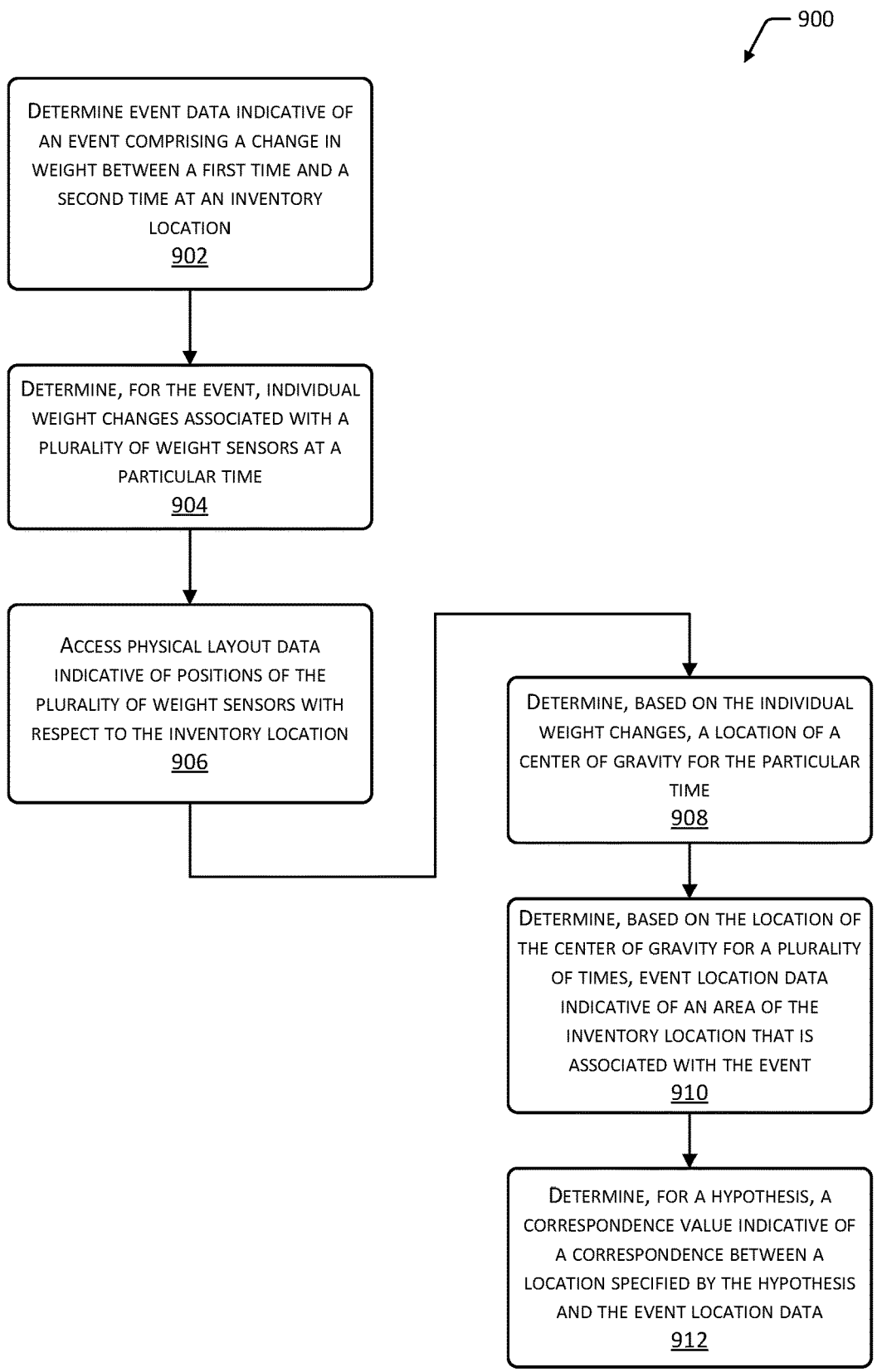
FIG. 9 illustrates a flow diagram of a process that uses event location data indicative of where at the inventory location a weight change took place to assess hypotheses, according to some implementations.

FIG. 9 illustrates a flow diagram 900 of a process that uses event location data 138 to assess hypotheses, according to some implementations. The process may be implemented at least in part by the event vector generation module 136 executing on one or more computing devices.

At 902, event data 122 is determined that is indicative of an event comprising a change in weight between a first time and a second time at an inventory location 102. For example, the event data 122 may be determined by the event detection module 120.

At 904, for the event, individual weight changes associated with a plurality of weight sensors 104 at a particular time are determined. For example, the individual weight changes for an event may comprise four weight changes, one for each of the four weight sensors 104(0)-104(3) at the inventory location 102.

At 906, physical layout data 132 is accessed that is indicative of positions of the plurality of weight sensors 104 with respect to the inventory location 102. For example, the physical layout data 132 may specify that for the particular inventory location 102 weight sensor 104(0) is centered at a point that is 10 cm along an x axis and −45 cm along a y axis, weight sensor 104(1) is centered at a point that is 10 cm along the x axis and −5 cm along the y axis, and so forth.

At 908, an estimated location of a center of gravity is determined for the weight changes associated with the particular time. For example, the estimated location of the center of gravity at a particular time t may be determined using the following equations.

$$x(t) = \left( \frac{x_L \cdot w_L(t) + x_R \cdot w_R(t)}{w_L(t) + w_R(t)} \right) \quad \text{EQUATION 7}$$

$$y(t) = \left( \frac{y_F \cdot w_F(t) + y_B \cdot w_B(t)}{w_F(t) + w_B(t)} \right) \quad \text{EQUATION 8}$$

In equations 7 and 8 $x_L$ specifies a location along an x axis (left to right along the inventory location 102) of the left weight sensors 104(0) and 104(1) and $x_R$ specifies a location along the x axis of the right weight sensors 104(2) and 104(3). Also, in these equations, $y_F$ specifies a location along a y axis (front to back) of the weight sensors 104(1) and 104(2) on the front of the platform and $y_B$ specifies a location along the y axis of the weight sensors 104(0) and 104(3). Also, in these equations, $w_L(t)$, $w_R(t)$, $w_F(t)$, and $w_B(t)$ respectively denote the weight changes associated with the time t at the left, right, front, and back weight sensors 104.

At 910, based on the estimated locations of the center of gravity for a plurality of times, event location data 138 may be determined that is indicative of an area 106 of the inventory location 102 that is associated with the event. For example, histogram data may be generated that is based on the plurality of estimated locations wherein each bin of the histogram is representative of a particular area 106. In other implementations other techniques may be used to assess the estimated locations.

At 912, a correspondence value may be determined that is indicative of a correspondence between a location specified by a hypothesis and the event location data 138. For example, if a hypothesis specifies a pick from area 106(D) at time t, and the event location data 138 is indicative of a change in weight at area 106(D) at time t, the correspondence value is high. In this example, the event location data 138 corroborates the hypothesis. The correspondence value may be used at least in part to rank hypotheses. For example, the first set of event hypotheses 134 may be ranked based on the confidence value 806 and the correspondence value.

The event location data 138 may be considered to provide trajectory data. For example, the event location data 138 may comprise a time series that indicates, for particular times or time intervals, physical locations at which an event is deemed to have occurred. By using the event location data 138 including the information as to timing of when an event happened and where, hypotheses may be more easily disambiguated. In some implementations, the event location data 138 may also indicate whether an object was picked or placed to the inventory location 102, based on a net weight change. While the object may not be identified, a positive weight change during an event is suggestive of an object being placed at the inventory location 102 while a negative weight change during an event is suggestive of an object being removed from the inventory location 102.

In some implementations, the inventory management system 114 may determine the event location data 138 and generation of the hypotheses may be based on this data. For example, the event vector generation module 136 may use the event data 122 to determine event location data 138. The inference module 128 may then use the event location data 138 to constrain the production of the first set of event hypotheses 134 to those hypotheses that correspond in terms of time, location, and whether the event was a pick or place. For example, if the event location data 138 indicates that at time t an item 108 was removed from area 106(D), then the hypotheses in the first set of event hypotheses 134 may be limited to those involving removal of items 108 at or near the area 106(D) at that time.

Figure 10:
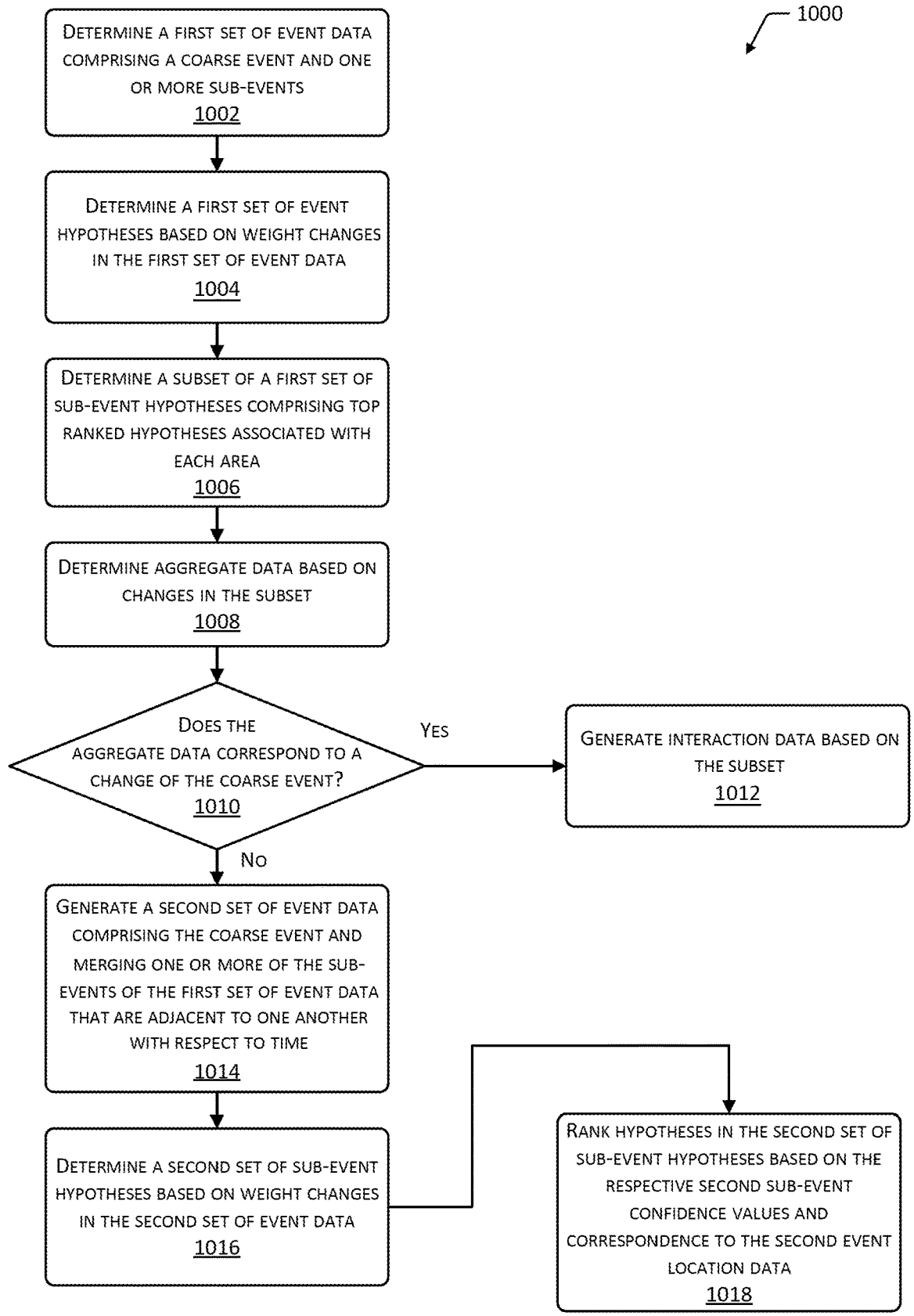
FIG. 10 illustrates a flow diagram of a process of hierarchical event analysis, according to some implementations.

FIG. 10 illustrates a flow diagram 1000 of a process of hierarchical event analysis, according to some implementations. The process may be implemented at least in part by the HEA module 140 executing on one or more computing devices.

As described above, in some implementations the confidence values associated with the first set of event hypotheses 134 may be insufficient to select a particular hypothesis for use in determining the interaction data 148. The use of the event location data 138 as described above may still be insufficient in some situations to disambiguate between the possible hypotheses in the first set of event hypotheses 134. The HEA module 140 may implement at least a portion of the following process to facilitate this disambiguation.

At 1002, a first set of event data 122(1) comprising a coarse event 310 and one or more sub-events 312 is determined. For example, the event detection module 120 may process the denoised data 118 to produce the first set of event data 122(1).

At 1004, a first set of event hypotheses is determined. The first set of event hypotheses may comprise a first set of coarse event hypotheses and a first set of sub-event hypotheses. The first set of event hypotheses may be determined based on the weight changes in the event data 122, such as weight changes of the one or more sub-events 312 in the first set of event data 122(1). For example, the inference module 128 may be used to determine the first set of event hypotheses 134 that includes the first set of sub-event hypotheses and a first set of coarse event hypotheses.

At 1006, a subset of a first set of sub-event hypotheses is determined. This subset may consist of top ranked hypotheses that are associated with one or more of each area 106 or type of item 108 at the inventory location 102. For example, the subset of the first set of sub-event hypotheses may comprise the top ranked hypothesis that is associated with area 106(A), the top ranked hypothesis that is associated with area 106(B), and so forth.

At 1008, aggregate data is determined based on the changes indicated in the hypotheses of the subset. In one implementation, the aggregate data may comprise a sum of the changes in quantity for each type of item 108 indicated by the hypotheses in the subset.

At 1010, a determination is made as to whether the aggregate data corresponds to or corroborates a change associated with the coarse event 310. For example, the coarse event 310 indicates that a quantity of two of the items of type 108(D) have been removed, while the changes in the sub-events 312 summed together indicate a removal of two of the items of type 108(D), then the aggregate data corresponds to the coarse event 310. This situation may occur when the user 110 is rummaging at the inventory location 102, removing items 108 to look at them and then returning them, then ultimately makes a decision and removes two of the item 108. During the rummaging, sub-events 312 may be generated indicating the pick and place of various items 108, such as a pick of a quantity of one of item 108(C) and a place of a quantity of one of item 108(C). These two sub-events 312 cancel one another out over the duration of the coarse event 310.

If at 1010 the determination is that the aggregate data corresponds to the coarse event 310, the process may proceed to 1012. At 1012, the interaction data 148 is generated based on the hypotheses in the subset. If at 1010 the aggregate data does not correspond to the coarse event 310, the process proceeds to 1014.

At 1014, a second set of event data 122(2) is generated that comprises the coarse event 310 and merging of one or more of the sub-events 312 in the first set of event data 122(1). For example, the sub-events 312 that are adjacent in time to one another may be merged into a single sub-event 312. In one implementation the merger may occur beginning with the sub-events 312 that are earliest in time. In another implementation, a sub-event 312 that is shortest in duration may be merged with an adjacent sub-event 312. In other implementations, other techniques to merge the sub-events 312 may be used. Merger of sub-events is illustrated above with regard to FIG. 3.

At 1016, a second set of event hypotheses 142 is determined based on the second set of event data 122(2). For example, the inference module 128 may use the weight changes of the coarse event 310 and sub-events 312 in the second set of event data 122(2) to generate the second set of event hypotheses 142 that include a second set of sub-event hypotheses.

At 1018, hypotheses in the second set of event hypotheses 142 may be ranked. For example, the second set of sub-event hypotheses may be ranked based on second sub-event confidence values and their correspondence values to the second event location data 138, such as described above. As described above, if the confidence values exceed one or more thresholds, the hypotheses may be used to generate interaction data 148. In other implementations, techniques other than ranking may be used. For example, the hypotheses may be assessed by comparing the confidence values to thresholds.

Figure 11:
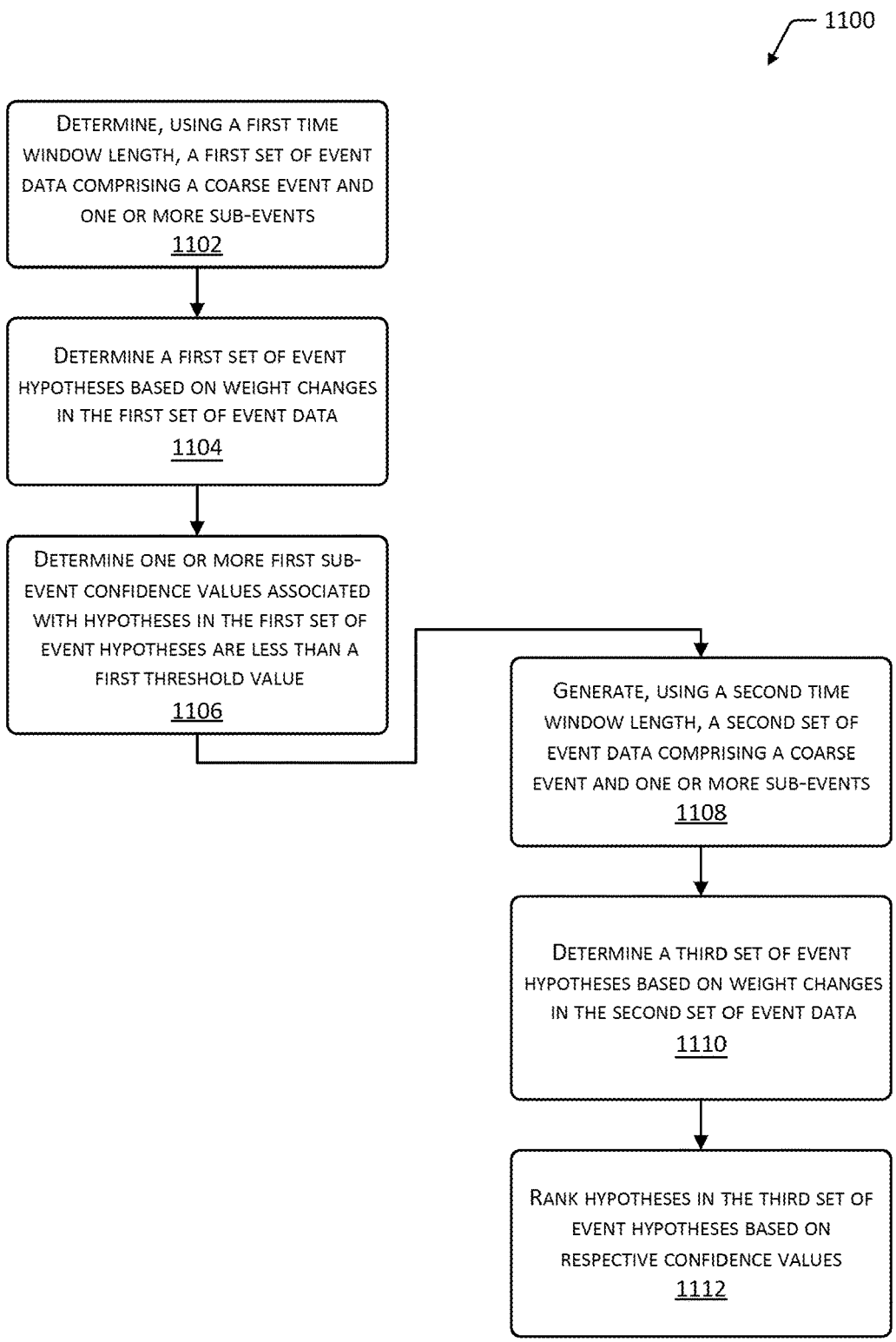
FIG. 11 illustrates a flow diagram of a process of fine grained analysis, according to some implementations.

FIG. 11 illustrates a flow diagram 1100 of a process of fine grained analysis, according to some implementations. The process may be implemented at least in part by the FGA module 144 executing on one or more computing devices.

In some implementations, the confidence values associated with the second set of event hypotheses 142 produced during operation of the HEA module 140 may be insufficient to select a particular hypothesis for use in determining the interaction data 148. The FGA module 144 may implement at least a portion of the following process to facilitate this disambiguation.

At 1102, a first set of event data 122(1) is determined using a first time window length. For example, the denoised data 118 may be processed by the event detection module 120 as discussed with regard to FIG. 2 using a first parameter value of 100 ms. The first set of event data 122(1) comprises a coarse event 310 and one or more sub-events 312.

At 1104, a first set of event hypotheses 134 are determined based on the first set of event data 122(1). For example, the inference module 128 may generate the first set of event hypotheses 134 that includes the first set of sub-event hypotheses that are based on the weight changes of the sub-events.

At 1106, one or more first sub-event confidence values associated with the hypotheses in the first set of event hypotheses 134 are determined to be less than a first threshold value. For example, the confidence values of these hypotheses may be below a threshold confidence value as discussed above. In some implementations, confidence values of the coarse event hypotheses may be compared to a threshold value as well.

At 1108, a second set of event data 122(2) is generated using a second time window length. The second time window length is different from the first time window length. For example, the first time window length may have a first parameter value of 100 ms, while the second time window length has a second parameter value of 250 ms. The denoised data 118 may be processed by the event detection module 120 as discussed with regard to FIG. 2. The second set of event data 122(2) comprises a coarse event 310 and one or more sub-events 312. Due to the difference in time window length, the individual events in the second set of event data 122(2), such as sub-events 312, may differ from the individual events of the first set of event data 122(1). This is illustrated above with regard to FIG. 4.

At 1110, a third set of event hypotheses 146 are determined based on the second set of event data 122(2). For example, the inference module 128 may use the second set of event data 122(2) to produce the third set of event hypotheses 146 that include a third set of coarse event hypotheses and sub-event hypotheses. For example, the third set of sub-event hypotheses are based on the weight changes associated with the respective sub-events 312.

At 1112, the hypotheses in the third set of event hypotheses 146 may be ranked based on respective confidence values. For example, the ranking may be based on respective third sub-event confidence values. In one implementation, if the confidence values meet the confidence threshold(s), the process may proceed to generate interaction data 148 based on the highest ranking hypotheses associated with each area 106.

Figure 12A:
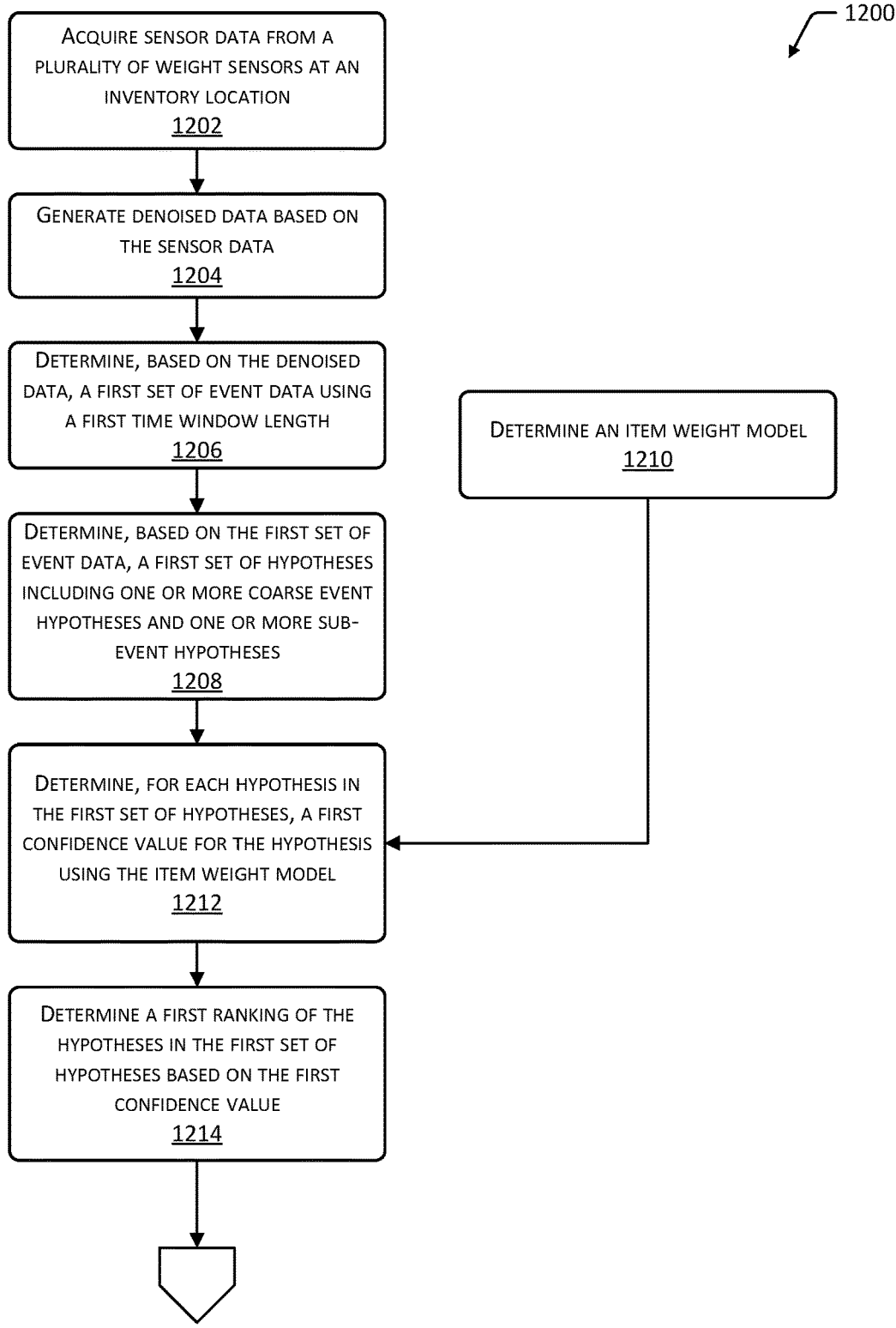
FIGS. 12A-12C illustrate a flow diagram of a process to process sensor data from one or more weight sensors and determine interaction data, according to some implementations.
Figure 12B:
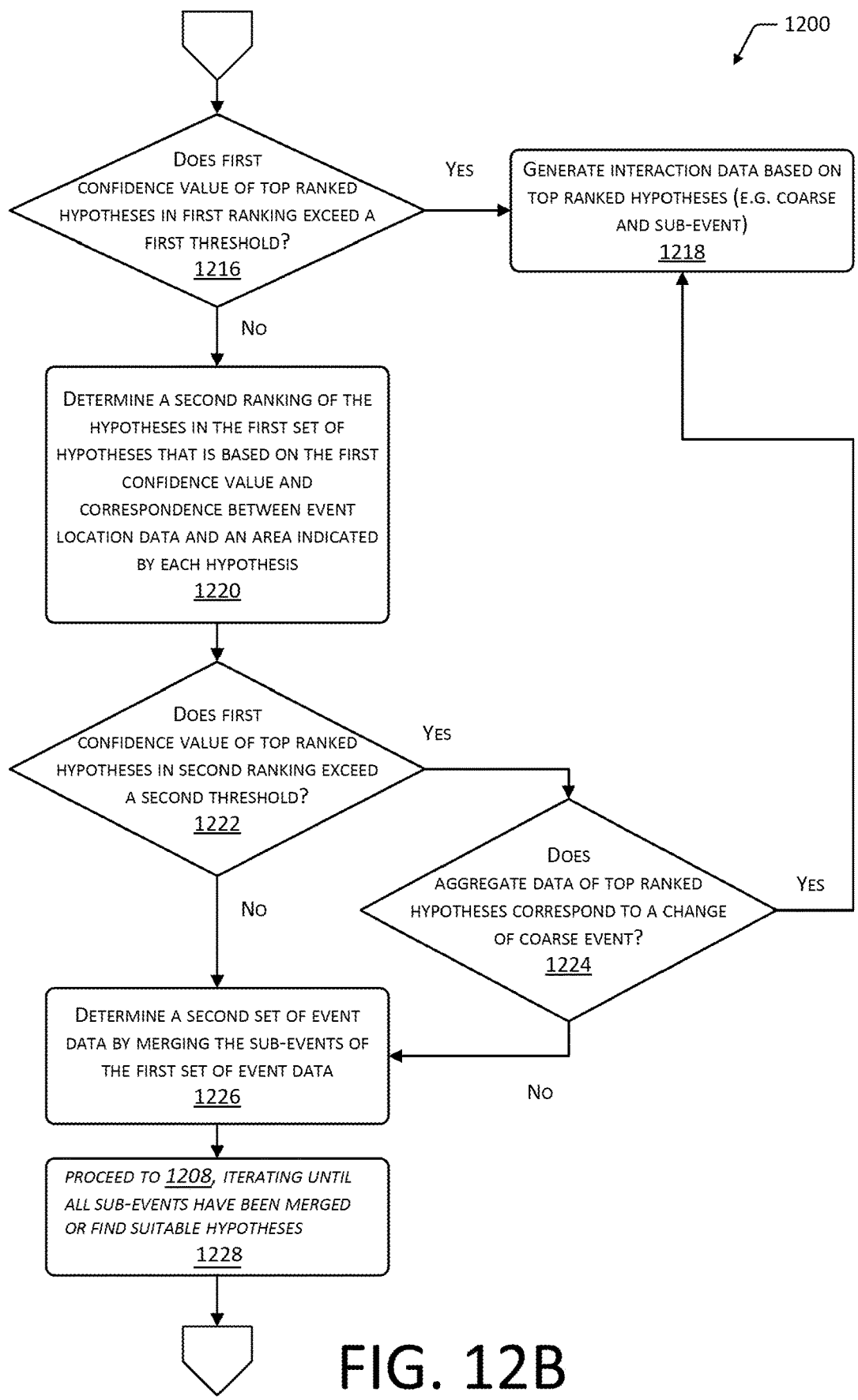
Figure 12C:
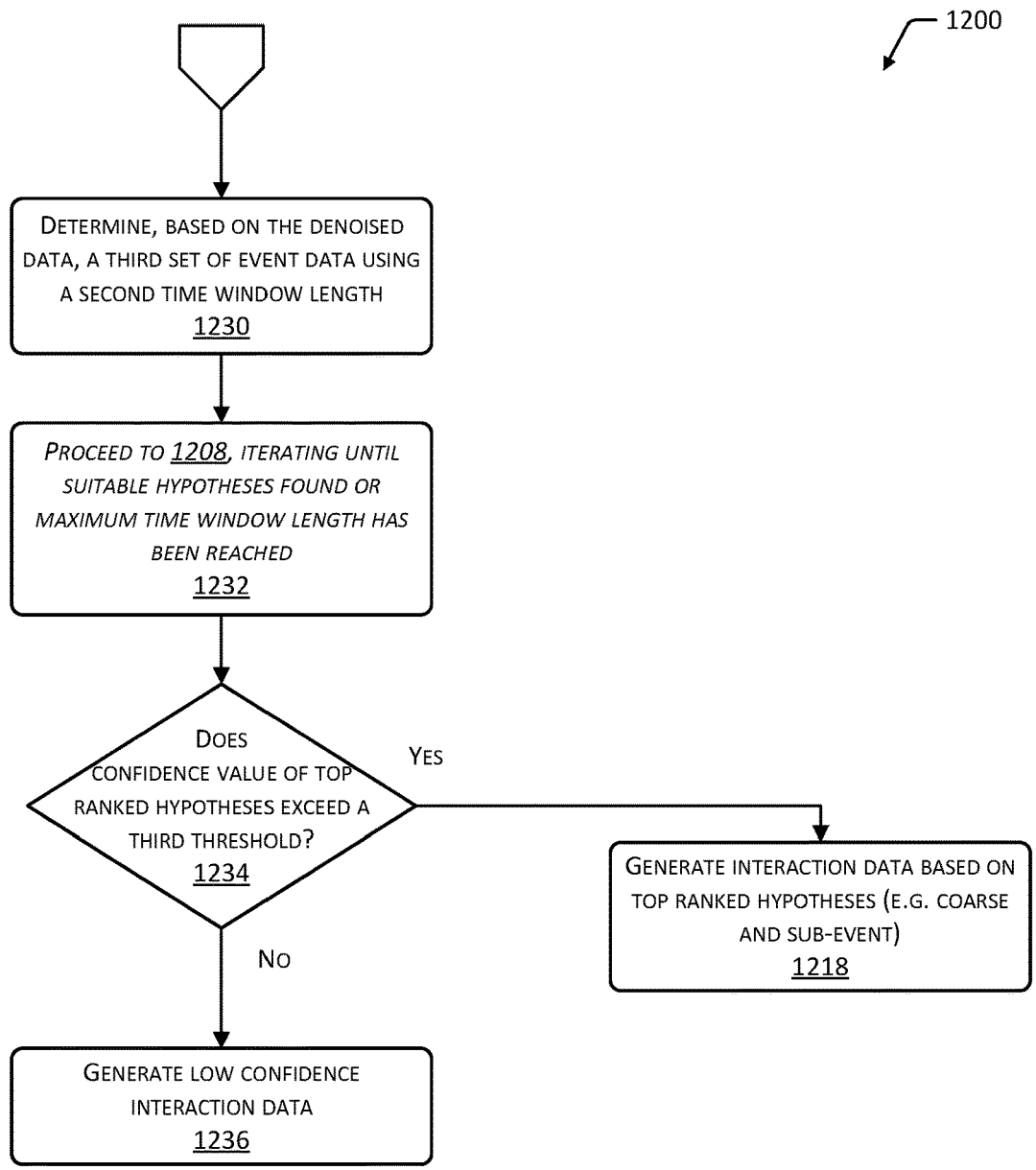

FIGS. 12A-12C illustrate a flow diagram 1200 of a process to process sensor data from a plurality of weight sensors and determine interaction data, according to some implementations. The process may be implemented at least in part by the inventory management system 114 executing on one or more computing devices.

At 1202, sensor data 112 is acquired from a plurality of weight sensors 104 at an inventory location 102. The weight sensors 104, or groupings thereof, may be arranged at different positions with respect to the inventory location 102. For example, the inventory location 102 may comprise a rectangular platform or shelf, with four groups of weight sensors 104, each group proximate to a corner of the platform. Each group may comprise one or more individual weight sensors 104.

At 1204, the sensor data 112 is processed to generate denoised data 118. For example, the signal conditioning module 116 may implement at least a portion of the process described above with regard to FIG. 2 to generate the denoised data 118.

At 1206, based on the denoised data 118, a first set of event data 122(1) is determined using a first time window length. For example, the event detection module 120 may use a first time window length of 100 ms to determine the first set of event data 122(1).

At 1208, based on the first set of event data 122(1), a first set of event hypotheses 134 is determined. For example, the inference module 128 may use the first set of event data 122(1) and one or more of the item data 130, the physical layout data 132, the item weight models 126, and so forth to determine one or more coarse event hypotheses and one or more sub-event hypotheses.

At 1210, one or more item weight models 126 may be determined by the item weight learning module 124. These models may be used to create a combined hypotheses model 802. For example, the probability distribution functions that are expressed by the first model 708 and the second model 710 may be used to determine a confidence value of a hypothesis.

At 1212, for each hypothesis in the first set of event hypotheses 134, a first confidence value is determined using one or more of the item weight models 126. For example, the inference module 128 may use the first weight change 602 and the second weight change 604 of an event to determine a confidence value 806 for a hypothesis associated with that event.

At 1214, a first ranking of the hypotheses in the first set of event hypotheses 134 based on the first confidence value is determined. In some implementations coarse events 310 may be ranked separately from sub-events 312.

At 1216, a determination is made as to whether the first confidence value of top ranked hypotheses in the first ranking exceeds a first threshold. If yes, the process proceeds to 1218, if no, the process proceeds to 1220. While a single threshold is illustrated, multiple thresholds may be used. For example, the first confidence value of a top ranked hypothesis may be compared to the first confidence value of a next ranked hypothesis. If a difference in the first confidence values of the top ranked and the next ranked hypotheses is greater than a threshold value, the top ranked hypothesis may be deemed representative of the interaction and the process proceeds to 1218. In another implementation, other comparisons may be made instead of, or in addition to, the difference. For example, if the top ranked hypothesis has a first confidence value greater than a threshold value, it may be deemed suitable for use in generating the interaction data 148. In another example, the first confidence value of the top ranked hypothesis may need to exceed a threshold value and the difference between the first confidence values of the top and next ranked hypotheses may also need to be exceeded.

At 1218, interaction data 148 is generated based on the top ranked hypotheses. For example, a top ranked coarse event hypothesis and corresponding top ranked sub-event hypotheses associated with each of the types of items 108 (or areas 106) of the inventory location 102 may be used to determine the interaction data 148.

Returning to 1216, if the confidence value of the top ranked hypotheses does not exceed the threshold, the process proceeds to 1220. The process may then use the event location data 138 to attempt to disambiguate between the hypotheses in the first set of event hypotheses 134. At 1220, a second ranking of the hypotheses is performed based on the first confidence value and a correspondence between the event location data 138 for that event (coarse event or sub-event) and the area 106 indicated by each hypothesis. For example, if a particular hypothesis indicates that a sub-event 312 involves area 106(A) and the event location data 138 indicates that at the time of sub-event 312 there was a change at area 106(D), this hypothesis would be ranked low or discarded altogether from further consideration. In some implementations, the correspondence between the event location data 138 and the hypothesis may be used to modify or adjust the first confidence value.

At 1222, a determination is made as to whether the first confidence values of top ranked hypotheses in the second ranking exceed one or more thresholds. As described above with regard to 1216, multiple thresholds may be used to assess the hypotheses. If yes, the process proceeds to 1224, if no, the process proceeds to 1226.

At 1224, a determination is made as to whether an aggregate data of the top ranked hypotheses corresponds to a change of a coarse event. If yes, the process proceeds to 1218, if no, the process proceeds to 1226. As described above with regard to FIG. 10, the aggregate data may be indicative of a combination of the changes in quantities of types of item 108 at particular areas 106 that are indicated by the sub-event hypotheses as occurring during a coarse event 310. For example, if the top sub-event hypotheses indicate +1D, −3D, +1D, the aggregate data would be −1D, indicating a quantity of one of item type 108(D) was picked from the inventory location 102. Continuing the example, if the coarse event 310 exhibits a positive weight change with a hypothesized interaction of +1B indicating a place of one of item 108(B) to the inventory location 102, then there is a lack of correspondence between the coarse event hypothesis and the top ranked sub-event hypotheses.

At 1226, a second set of event data 122(2) is determined by merging sub-events 312 of the first set of event data 122(1). For example, the HEA module 140 may merge sub-events 312(1) and 312(2) as depicted in the second graph 304 of FIG. 3.

At 1228, the process may return to 1208 following which the second set of event data 122(2) is processed as described above, continuing to iterate until all sub-events 312 have been merged, suitable hypotheses that meet the thresholds have been found, or other conditions are met. For example, if the confidence values of the resulting hypotheses fail to meet the thresholds described above, the process may iteratively proceed to further merge sub-events 312. The iteration may cease when hypotheses are determined that meet the thresholds described above, or all sub-events have been merged.

In the event that the hypotheses resulting from this merging fail to meet the thresholds described above, the process may proceed to 1230.

At 1230, third event data 122(3) is determined based on the denoised data 118 and using a second time window length. For example, the FGA module 144 may direct the event detection module 120 to use a second time window length of 250 ms to determine the third event data 122(3).

At 1232, the process may return to 1208 and proceed to process the third event data 122(3) as described above, continuing to iterate until a maximum time window length is reached, suitable hypotheses that meet the thresholds have been found, or other conditions are met. If the confidence values of the resulting hypotheses fail to meet the thresholds described above, the process may iteratively proceed to further increase the time window length used to generate subsequent event data 122. In one implementation, the iteration may cease when the time window length reaches a maximum window length. In other implementations, other thresholds may be used to terminate iteration, such as when the time window length exceeds a duration of a coarse event 310.

During iteration, the process combines the various iterations described above. For example, after generating the third event data 122(3), the process may iterate through merging the sub-events in the third event data 122(3).

At 1234, a determination is made as to whether the confidence values of top ranked hypotheses produced by the third event data 122(3) or subsequent event data exceed one or more thresholds. As described above with regard to 1216, multiple thresholds may be used to assess the hypotheses. If yes, the process proceeds to 1218, if no, the process proceeds to 1236.

At 1236, the highest ranked hypotheses are used to generate interaction data 148. Because of the failure to meet the thresholds indicated above, this interaction data 148 may be deemed to be of low confidence. In some implementations low confidence interaction data 148 may be subject to further processing. For example, a human operator may use sensor data 112 associated with the interaction to determine the interaction data 148. In another example, another automated system may be used to assess the sensor data 112 and determine high confidence interaction data 148. In yet another example, the low confidence interaction data 148 may be disregarded. For example, the inventory management system 114 may be configured to not generate user billing data based on low confidence interaction data 148.

Figure 13:
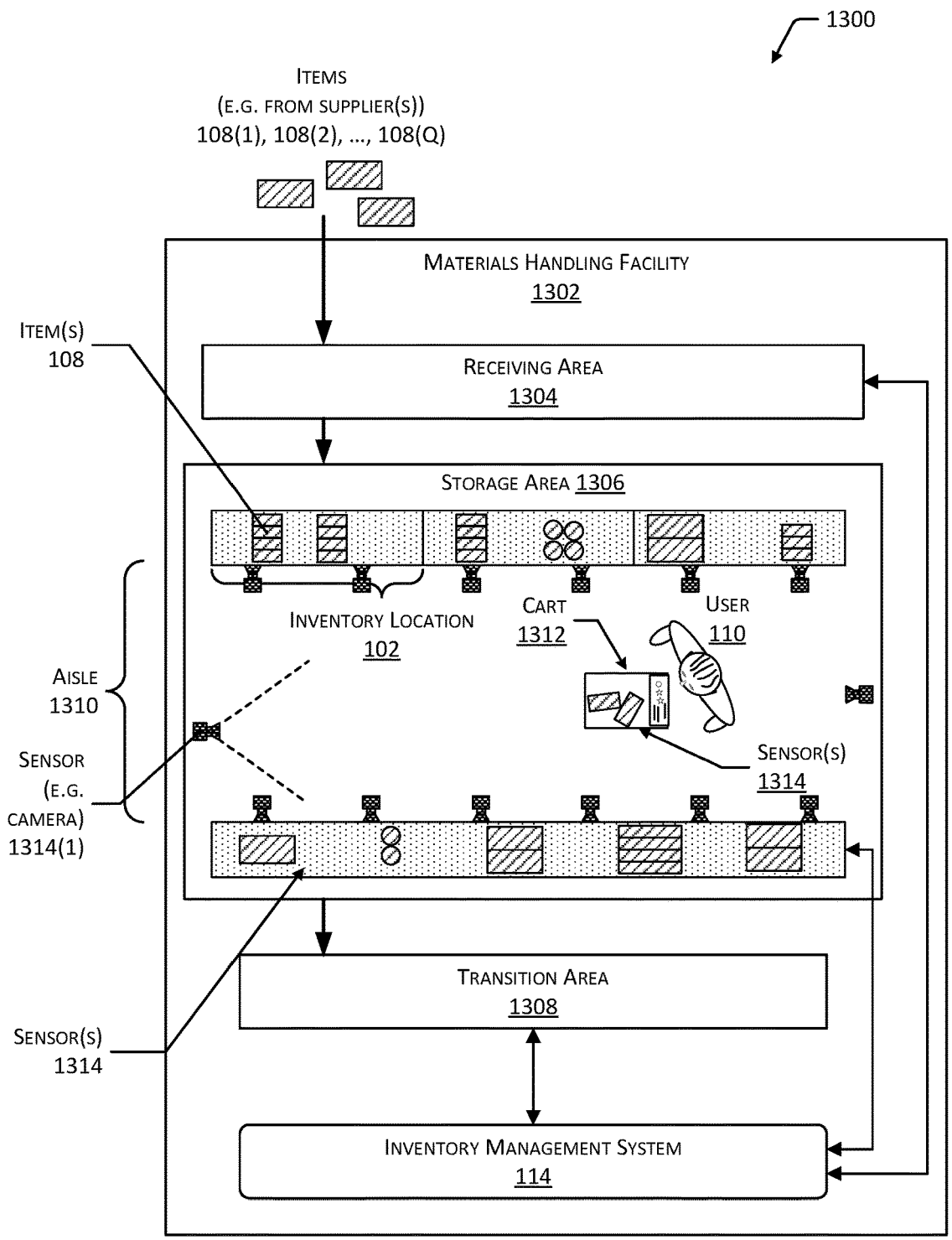
FIG. 13 is a block diagram illustrating a materials handling facility (facility) using the system, according to some implementations.

FIG. 13 is a block diagram 1300 illustrating a material handling facility (facility) 1302 using the system 100, according to some implementations. A facility 1302 comprises one or more physical structures or areas within which one or more items 108(1), 108(2), . . . , 108(Q) may be held. The items 108 may comprise physical goods, such as books, pharmaceuticals, repair parts, electronic gear, and so forth.

The facility 1302 may include one or more areas designated for different functions with regard to inventory handling. In this illustration, the facility 1302 includes a receiving area 1304, a storage area 1306, and a transition area 1308.

The receiving area 1304 may be configured to accept items 108, such as from suppliers, for intake into the facility 1302. For example, the receiving area 1304 may include a loading dock at which trucks or other freight conveyances unload the items 108. In some implementations, the items 108 may be processed, at the receiving area 1304, to generate at least a portion of the item data 130. For example, an item 108 may be weighed, imaged or otherwise scanned to develop reference images or representations of the item 108 at the receiving area 1304.

The storage area 1306 is configured to store the items 108. The storage area 1306 may be arranged in various physical configurations. In one implementation, the storage area 1306 may include one or more aisles 1310. The aisle 1310 may be configured with, or defined by, inventory locations 102 on one or both sides of the aisle 1310. The inventory locations 102 may include one or more of a platform, a rack, a case, a cabinet, a bin, a floor location, or other suitable storage mechanisms for holding, supporting, or storing the items 108. For example, the inventory locations 102 may comprise shelves with areas 106 such as lanes designated therein. The inventory locations 102 may be affixed to the floor or another portion of the structure of the facility 1302. The inventory locations 102 may also be movable such that the arrangements of aisles 1310 may be reconfigurable. In some implementations, the inventory locations 102 may be configured to move independently of an outside operator. For example, the inventory locations 102 may comprise a rack with a power source and a motor, operable by a computing device to allow the rack to move from one location within the facility 1302 to another.

One or more users 110 and carts 1312 or other material handling apparatus may move within the facility 1302. For example, the user 110 may move about within the facility 1302 to pick or place the items 108 in various inventory locations 102, placing them in the cart 1312 for ease of transport. The cart 1312 is configured to carry or otherwise transport one or more items 108. For example, the cart 1312 may include a basket, cart, bag, bin, and so forth. In other implementations, other material handling apparatuses such as robots, forklifts, cranes, aerial drones, and so forth, may move about the facility 1302 picking, placing, or otherwise moving the items 108. For example, a robot may pick an item 108 from a first inventory location 102(1) and move the item 108 to a second inventory location 102(2).

While the storage area 1306 is depicted as having one or more aisles 1310, inventory locations 102 storing the items 108, sensors 1314, and so forth, it is understood that the receiving area 1304, the transition area 1308, or other areas of the facility 1302 may be similarly equipped. Furthermore, the arrangement of the various areas within the facility 1302 is depicted functionally rather than schematically. For example, in some implementations, multiple different receiving areas 1304, storage areas 1306, and transition areas 1308 may be interspersed rather than segregated in the facility 1302.

The facility 1302 may include, or be coupled to, the inventory management system 114 described above. The inventory management system 114 is configured to interact with the user 110 or devices such as sensors 1314, robots, material handling equipment, computing devices, and so forth, in one or more of the receiving area 1304, the storage area 1306, or the transition area 1308.

During operation of the facility 1302, the weight sensors 104 and other sensors 1314 may be configured to provide sensor data 112, or information based on the sensor data 112, to the inventory management system 114. In addition to data obtained from the weight sensors 104, the sensor data 112 may include image data, non-image data, and so forth. The sensors 1314 may include, but are not limited to, weight sensors 104, cameras 1314(1), and so forth. The sensors 1314 may be stationary or mobile, relative to the facility 1302. For example, the facility 1302 may include cameras 1314(1) to obtain images of the user 110 or other objects in the facility 1302. In another example, the inventory locations 102 may contain weight sensors 104 to acquire weight sensor data of items 108 stowed therein, cameras 1314(1) to acquire images of picking or placement of items 108 on shelves, and so forth. The sensors 1314 are described in more detail below with regard to FIG. 14.

The inventory management system 114 or other systems may use the sensor data 112 to track the location of objects within the facility 1302, movement of the objects, or provide other functionality. Objects may include, but are not limited to, items 108, users 110, carts 1312, and so forth. For example, a series of images acquired by the cameras 1314(1) may indicate removal by the user 110 of an item 108 from a particular location at the inventory location 102 and placement of the item 108 on or at least partially within the cart 1312.

The facility 1302 may be configured to receive different kinds of items 108 from various suppliers and to store them until a customer orders or retrieves one or more of the items 108. A general flow of items 108 through the facility 1302 is indicated by the arrows of FIG. 13. Specifically, as illustrated in this example, items 108 may be received from one or more suppliers, such as manufacturers, distributors, wholesalers, and so forth, at the receiving area 1304. In various implementations, the items 108 may include merchandise, commodities, perishables, or any suitable type of item 108, depending on the nature of the enterprise that operates the facility 1302.

Upon being received from a supplier at the receiving area 1304, the items 108 may be prepared for storage in the storage area 1306. For example, in some implementations, items 108 may be unpacked or otherwise rearranged. The inventory management system 114 may include one or more software applications executing on a computer system to provide inventory management functions. These inventory management functions may include maintaining information indicative of the type, quantity, condition, cost, location, weight, or any other suitable parameters with respect to the items 108. The items 108 may be stocked, managed, or dispensed in terms of countable units, individual units, or multiple units, such as packages, cartons, crates, pallets, or other suitable aggregations. Alternatively, some items 108, such as bulk products, commodities, and so forth, may be stored in continuous or arbitrarily divisible amounts that may not be inherently organized into countable units. Such items 108 may be managed in terms of a measurable quantity such as units of length, area, volume, weight, time, duration, or other dimensional properties characterized by units of measurement. Generally speaking, a quantity of an item 108 may refer to either a countable number of individual or aggregate units of an item 108 or a measurable amount of an item 108, as appropriate.

After arriving through the receiving area 1304, items 108 may be stored within the storage area 1306. In some implementations, like items 108 may be stored or displayed together in the inventory locations 102 such as in bins, on shelves, hanging from pegboards, and so forth. In this implementation, all items 108 of a given kind are stored in one inventory location 102. In other implementations, like items 108 may be stored in different inventory locations 102. For example, to optimize retrieval of certain items 108 having frequent turnover within a large physical facility 1302, those items 108 may be stored in several different inventory locations 102 to reduce congestion that might occur at a single inventory location 102.

When a customer order specifying one or more items 108 is received, or as a user 110 progresses through the facility 1302, the corresponding items 108 may be selected or "picked" from the inventory locations 102 containing those items 108. In various implementations, item picking may range from manual to completely automated picking. For example, in one implementation, a user 110 may have a list of items 108 they desire and may progress through the facility 1302 picking items 108 from inventory locations 102 within the storage area 1306 and placing those items 108 into a cart 1312. In other implementations, employees of the facility 1302 may pick items 108 using written or electronic pick lists derived from customer orders. These picked items 108 may be placed into the cart 1312 as the employee progresses through the facility 1302.

After items 108 have been picked, the items 108 may be processed at a transition area 1308. The transition area 1308 may be any designated area within the facility 1302 where items 108 are transitioned from one location to another or from one entity to another. For example, the transition area 1308 may be a packing station within the facility 1302. When the item 108 arrives at the transition area 1308, the item 108 may be transitioned from the storage area 1306 to the packing station. Information about the transition may be maintained by the inventory management system 114.

In another example, if the items 108 are departing the facility 1302, a list of the items 108 may be obtained and used by the inventory management system 114 to transition responsibility for, or custody of, the items 108 from the facility 1302 to another entity. For example, a carrier may accept the items 108 for transport with that carrier accepting responsibility for the items 108 indicated in the list. In another example, a user 110 may purchase or rent the items 108 and remove the items 108 from the facility 1302. During use of the facility 1302, the user 110 may move about the facility 1302 to perform various tasks, such as picking or placing the items 108 in the inventory locations 102.

To facilitate operation of the facility 1302, the inventory management system 114 is configured to use the sensor data 112, such as data from weight sensors 104, image data, and other information such as the item data 130, the physical layout data 132, and so forth, to generate interaction data 148.

The interaction data 148 may provide information about an interaction, such as a pick of an item 108 from the inventory location 102, a place of an item 108 to the inventory location 102, a touch made to an item 108 at the inventory location 102, a gesture associated with an item 108 at the inventory location 102, and so forth. The interaction data 148 may include one or more of the type of interaction, interaction location identifier indicative of where from the inventory location 102 the interaction took place, item identifier, quantity change to the item 108, user identifier, and so forth. The interaction data 148 may then be used to further update the item data 130. For example, the quantity of items 108 on hand at a particular lane on the platform may be changed based on an interaction that picks or places one or more items 108.

As described above, the inventory management system 114 may perform other operations, determining inventory to restock, determining user billing data, and so forth.

Figure 14:
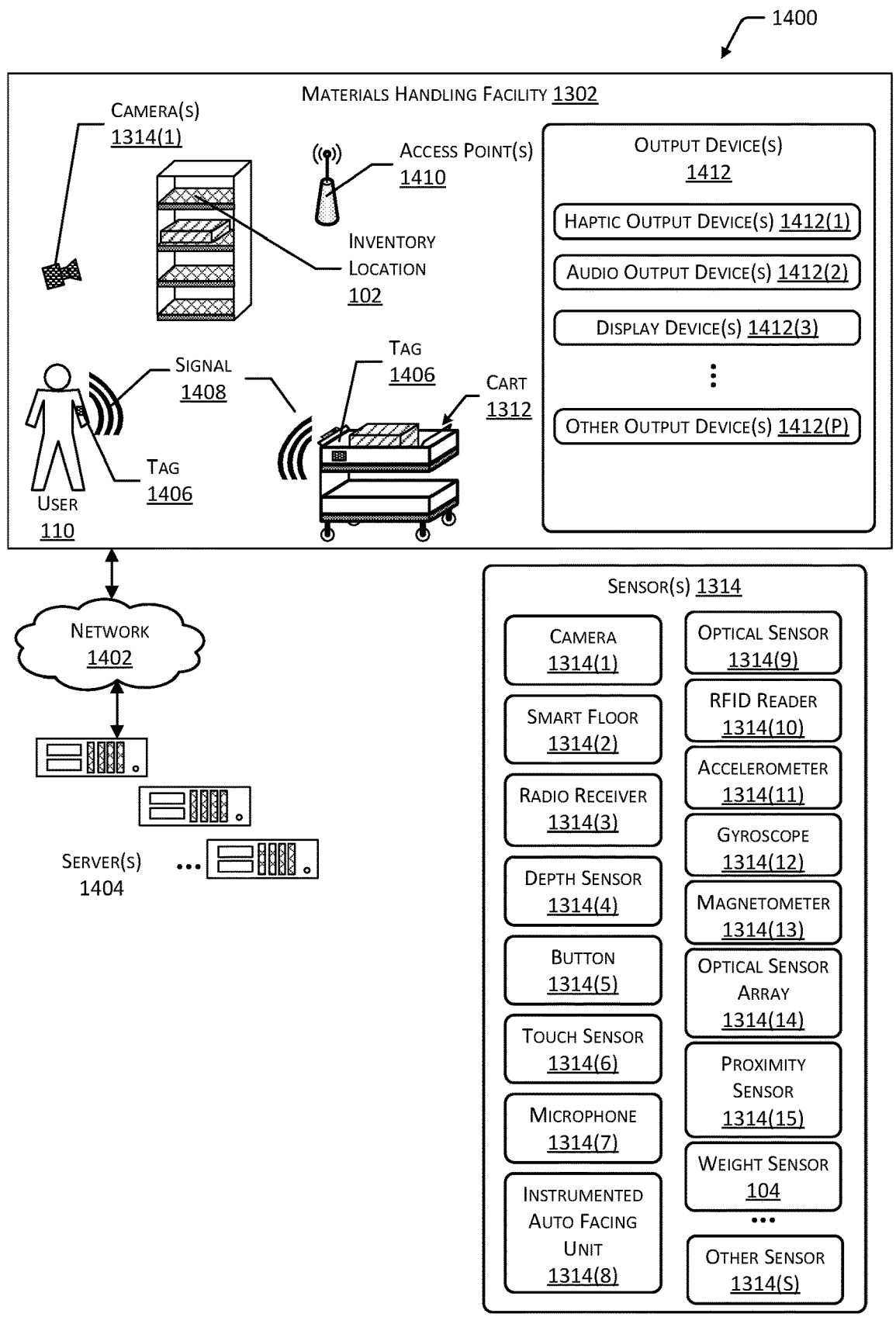
FIG. 14 is a block diagram illustrating additional details of the facility, according to some implementations.

FIG. 14 is a block diagram 1400 illustrating additional details of the facility 1302, according to some implementations. The facility 1302 may be connected to one or more networks 1402, which in turn connect to one or more computing devices, such as servers 1404. The network 1402 may include private networks such as an institutional or personal intranet, public networks such as the Internet, or a combination thereof. The network 1402 may utilize wired technologies (e.g., wires, fiber optic cables, and so forth), wireless technologies (e.g., radio frequency, infrared, acoustic, optical, and so forth), or other connection technologies. The network 1402 is representative of any type of communication network, including one or more of data networks or voice networks. The network 1402 may be implemented using wired infrastructure (e.g., copper cable, fiber optic cable, and so forth), a wireless infrastructure (e.g., cellular, microwave, satellite, and so forth), or other connection technologies.

The servers 1404 may be configured to execute one or more modules or software applications associated with the inventory management system 114 or other systems. While the servers 1404 are illustrated as being in a location outside of the facility 1302, in other implementations, at least a portion of the servers 1404 may be located at the facility 1302. The servers 1404 are discussed in more detail below with regard to FIG. 15.

The users 110, the carts 1312, items 108, or other objects in the facility 1302 may be equipped with one or more tags 1406. The tags 1406 may be configured to emit a signal 1408. In one implementation, the tag 1406 may be a radio frequency identification (RFID) tag 1406 configured to emit an RF signal 1408 upon activation by an external signal. For example, the external signal may comprise a radio frequency signal or a magnetic field configured to energize or activate the RFID tag 1406. In another implementation, the tag 1406 may comprise a transmitter and a power source configured to power the transmitter. For example, the tag 1406 may comprise a Bluetooth Low Energy (BLE) transmitter and battery. In other implementations, the tag 1406 may use other techniques to indicate presence of the tag 1406. For example, an acoustic tag 1406 may be configured to generate an ultrasonic signal 1408, which is detected by corresponding acoustic receivers. In yet another implementation, the tag 1406 may be configured to emit an optical signal 1408.

The inventory management system 114 may be configured to use the tags 1406 for one or more of identification of the object, determining a location of the object, and so forth. For example, the user 110 may wear tags 1406, the carts 1312 may have tags 1406 affixed, items 108 may have tags 1406 affixed to their packaging, and so forth, which may be read and, based at least in part on signal strength, used to determine one or more of identity or location.

Generally, the inventory management system 114 or other systems associated with the facility 1302 may include any number and combination of input components, output components, and servers 1404.

The one or more sensors 1314 may be arranged at one or more locations within the facility 1302. For example, the sensors 1314 may be mounted on or within a floor, wall, at a ceiling, at an inventory location 102, on a cart 1312, may be carried or worn by a user 110, and so forth.

The sensors 1314 may include one or more cameras 1314(1) or other imaging sensors. The one or more cameras 1314(1) may include imaging sensors configured to acquire images of a scene. The cameras 1314(1) are configured to detect light in one or more wavelengths including, but not limited to, terahertz, infrared, visible, ultraviolet, and so forth. The cameras 1314(1) may comprise charge coupled devices (CCD), complementary metal oxide semiconductor (CMOS) devices, microbolometers, and so forth. The inventory management system 114 may use image data acquired by the cameras 1314(1) during operation of the facility 1302. For example, the inventory management system 114 may identify items 108, users 110, carts 1312, and so forth, based at least in part on their appearance within the image data acquired by the cameras 1314(1). The cameras 1314(1) may be mounted in various locations within the facility 1302. For example, cameras 1314(1) may be mounted overhead, on inventory locations 102, may be worn or carried by a user 110, may be affixed to carts 1312, and so forth.

The sensors 1314 may include a smart floor 1314(2). The smart floor 1314(2) is able to provide information about the location of objects, such as users 110, carts 1312, and so forth. This information may include identifying the object, determining a location of the object, tracking the object, and so forth. The smart floor 1314(2) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 1314(2) may comprise sensing elements, or segments. Each segment may include an antenna that is coupled to one or more of a transmitter or a receiver. During operation, the segment may transmit an electromagnetic signal 1408 that is radiated by the antenna, receive an electromagnetic signal that is acquired by the antenna, or both. In some implementations the smart floor 1314(2) may operate as a physically large touch sensor that is deployed at floor level. The electromagnetic signals to provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 1314(2) may be used to provide object representation movement data. For example, the output from the segments obtained during a particular window of time may be processed in a fashion similar to the image data.

One or more radio receivers 1314(3) may also be included as sensors 1314. In some implementations, the radio receivers 1314(3) may be part of transceiver assemblies. The radio receivers 1314(3) may be configured to acquire RF signals 1408 associated with RFID, Wi-Fi, Bluetooth, ZigBee, 2G, 3G, 4G, LTE, or other wireless data transmission technologies. The radio receivers 1314(3) may provide information associated with data transmitted via radio frequencies, signal strength of RF signals 1408, and so forth. For example, information from the radio receivers 1314(3) may be used by the inventory management system 114 to determine a location of an RF source, such as a transmitter carried by the user 110, a transmitter on the cart 1312, a tag 1406 on the item 108, and so forth.

One or more depth sensors 1314(4) may also be included in the sensors 1314. The depth sensors 1314(4) are configured to acquire spatial or three-dimensional (3D) data, such as depth information, about objects within a field-of-view (FOV). The depth sensors 1314(4) may include range cameras, lidar systems, sonar systems, radar systems, structured light systems, stereo vision systems, optical interferometry systems, and so forth. The inventory management system 114 may use the 3D data acquired by the depth sensors 1314(4) to identify objects, determine a location of an object in 3D real space, identify user 110, and so forth.

One or more buttons 1314(5) may be configured to accept input from the user 110. The buttons 1314(5) may comprise mechanical, capacitive, optical, or other mechanisms. For example, the buttons 1314(5) may comprise mechanical switches configured to accept an applied force from a touch of the user 110 to generate an input signal. The inventory management system 114 may use data from the buttons 1314(5) to receive information from the user 110. For example, the cart 1312 may be configured with a button 1314(5) to accept input from the user 110 and send information indicative of the input to the inventory management system 114.

The sensors 1314 may include one or more touch sensors 1314(6). The touch sensors 1314(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 114 may use data from the touch sensors 1314(6) to receive information from the user 110. For example, the touch sensor 1314(6) may be integrated with the cart 1312 to provide a touchscreen with which the user 110 may select from a menu one or more particular items 108 for picking, enter a manual count of items 108 at an inventory location 102, and so forth.

One or more microphones 1314(7) may be configured to acquire information indicative of sound present in the environment. In some implementations, arrays of microphones 1314(7) may be used. These arrays may implement beamforming techniques to provide for directionality of gain. The inventory management system 114 may use the one or more microphones 1314(7) to acquire information from acoustic tags 1406, accept voice input from the user 110, determine ambient noise level, and so forth.

The sensors 1314 may include instrumented auto facing units (IAFUs) 1314(8). The IAFU 1314(8) may comprise a position sensor configured to provide data indicative of displacement of a pusher. As an item 108 is removed from the IAFU 1314(8), the pusher moves, such as under the influence of a spring, and pushes the remaining items 108 in the IAFU 1314(8) to the front of the inventory location 102. By using data from the position sensor, and given item data 130 such as a depth of an individual item 108, a count may be determined, based on a change in position data. For example, if each item 108 is 1 inch deep, and the position data indicates a change of 14 inches, the quantity held by the IAFU 1314(8) may have changed by 14 items 108. This count information may be used to confirm or provide a cross check for a count obtained by other means, such as analysis of the sensor data 112 from the weight sensors 104.

The sensors 1314 may include one or more optical sensors 1314(9). The optical sensors 1314(9) may be configured to provide data indicative of one or more of color or intensity of light impinging thereupon. For example, the optical sensor 1314(9) may comprise a photodiode and associated circuitry configured to generate a signal 1408 or data indicative of an incident flux of photons. As described below, the optical sensor array 1314(14) may comprise a plurality of the optical sensors 1314(9). The optical sensors 1314(9) may include photodiodes, photoresistors, photovoltaic cells, quantum dot photoconductors, bolometers, pyroelectric infrared detectors, and so forth. For example, the optical sensor 1314(9) may use germanium photodiodes to detect infrared light.

One or more radio frequency identification (RFID) readers 1314(10), near field communication (NFC) systems, and so forth, may be included as sensors 1314. For example, the RFID readers 1314(10) may be configured to read the RF tags 1406. Information acquired by the RFID reader 1314(10) may be used by the inventory management system 114 to identify an object associated with the RF tag 1406 such as the item 108, the user 110, the cart 1312, and so forth. For example, based on information from the RFID readers 1314(10) detecting the RF tag 1406 at a particular inventory location, an item 108 being placed or picked may be determined.

The sensors 1314 may include one or more accelerometers 1314(11), which may be worn or carried by the user 110, mounted to the cart 1312, and so forth. The accelerometers 1314(11) may provide information such as the direction and magnitude of an imposed acceleration. Data such as rate of acceleration, determination of changes in direction, speed, and so forth, may be determined using the accelerometers 1314(11).

A gyroscope 1314(12) may provide information indicative of rotation of an object affixed thereto. For example, the cart 1312 or other objects may be equipped with a gyroscope 1314(12) to provide data indicative of a change in orientation of the object.

A magnetometer 1314(13) may be used to determine an orientation by measuring ambient magnetic fields, such as the terrestrial magnetic field. The magnetometer 1314(13) may be worn or carried by the user 110, mounted to the cart 1312, and so forth. For example, the magnetometer 1314 (13) mounted to the cart 1312 may act as a compass and provide information indicative of which direction the cart 1312 is oriented.

An optical sensor array 1314(14) may comprise one or optical sensors 1314(9). The optical sensors 1314(9) may be arranged in a regular, repeating, or periodic two-dimensional arrangement such as a grid. The optical sensor array 1314 (14) may generate image data. For example, the optical sensor array 1314(14) may be arranged within or below an inventory location 102 and obtain information about shadows of items 108, hand of the user 110, and so forth.

The sensors 1314 may include proximity sensors 1314 (15) used to determine presence of an object, such as the user 110, the cart 1312, and so forth. The proximity sensors 1314(15) may use optical, electrical, ultrasonic, electromagnetic, or other techniques to determine a presence of an object. In some implementations, the proximity sensors 1314(15) may use an optical emitter and an optical detector to determine proximity. For example, an optical emitter may emit light, a portion of which may then be reflected by the object back to the optical detector to provide an indication that the object is proximate to the proximity sensor 1314 (15). In other implementations, the proximity sensors 1314 (15) may comprise a capacitive proximity sensor 1314(15) configured to provide an electrical field and determine a change in electrical capacitance due to presence or absence of an object within the electrical field.

The proximity sensors 1314(15) may be configured to provide sensor data 112 indicative of one or more of a presence or absence of an object, a distance to the object, or characteristics of the object. An optical proximity sensor 1314(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1314 such as a camera 1314(1). Based on an apparent distance between the features of the structured light pattern, the distance to the object may be calculated. Other techniques may also be used to determine distance to the object. In another example, the color of the reflected light may be used to characterize the object, such as skin, clothing, cart 1312, and so forth.

The one or more weight sensors 104 are configured to measure the weight of a load, such as the item 108, the cart 1312, or other objects. The weight sensors 104 may be configured to measure the weight of the load at one or more of the inventory locations 102, the cart 1312, on the floor of the facility 1302, and so forth. For example, a platform of the inventory location 102 may include a plurality of weight sensors 104. The weight sensors 104 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 104 may operate as transducers that generate one or more signals based on an applied force, such as that of the load due to gravity. For example, the weight sensor 104 may comprise a load cell having a strain gauge and a structural member that deforms slightly when weight is applied. By measuring a change in the electrical characteristic of the strain gauge, such as capacitance or resistance, the weight may be determined. In another example, the weight sensor 104 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 114 may use the data acquired by the weight sensors 104 to identify an object, determine a change in the quantity of objects, determine a location of an object, maintain shipping records, and so forth.

The sensors 1314 may include other sensors 1314(S) as well. For example, the other sensors 1314(S) may include light curtains, ultrasonic rangefinders, thermometers, barometric sensors, hygrometers, and so forth.

In some implementations, the sensors 1314 may include hardware processors, memory, and other elements configured to perform various functions. For example, the cameras 1314(1) may be configured to generate image data, send the image data to another device such as the server 1404, and so forth.

The facility 1302 may include one or more access points 1410 configured to establish one or more wireless networks. The access points 1410 may use Wi-Fi, NFC, Bluetooth, or other technologies to establish wireless communications between a device and the network 1402. The wireless networks allow the devices to communicate with one or more of the sensors 1314, the inventory management system 114, the tags 1406, a communication device of the cart 1312, or other devices.

Output devices 1412 may also be provided in the facility 1302. The output devices 1412 are configured to generate signals 1408, which may be perceived by the user 110 or detected by the sensors 1314. In some implementations, the output devices 1412 may be used to provide illumination of the optical sensor array 1314(14).

Haptic output devices 1412(1) are configured to provide a signal 1408 that results in a tactile sensation to the user 110. The haptic output devices 1412(1) may use one or more mechanisms such as electrical stimulation or mechanical displacement to provide the signal 1408. For example, the haptic output devices 1412(1) may be configured to generate a modulated electrical signal, which produces an apparent tactile sensation in one or more fingers of the user 110. In another example, the haptic output devices 1412(1) may comprise piezoelectric or rotary motor devices configured to provide a vibration, which may be felt by the user 110.

One or more audio output devices 1412(2) may be configured to provide acoustic output. The acoustic output includes one or more of infrasonic sound, audible sound, or ultrasonic sound. The audio output devices 1412(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1412(3) may be configured to provide output, which may be seen by the user 110 or detected by a light-sensitive sensor such as a camera 1314(1) or an optical sensor 1314(9). In some implementations, the display devices 1412(3) may be configured to produce output in one or more of infrared, visible, or ultraviolet light. The output may be monochrome or in color. The display devices 1412(3) may be one or more of emissive, reflective, microelectromechanical, and so forth. An emissive display device 1412(3), such as using LEDs, is configured to emit light during operation. In comparison, a reflective display device 1412(3), such as using an electrophoretic element, relies on ambient light to present an image. Backlights or front lights may be used to illuminate non-emissive display devices 1412(3) to provide visibility of the output in conditions where the ambient light levels are low.

The display devices 1412(3) may be located at various points within the facility 1302. For example, the addressable displays may be located on inventory locations 102, carts 1312, on the floor of the facility 1302, and so forth.

Other output devices 1412(P) may also be present. For example, the other output devices 1412(P) may include scent/odor dispensers, document printers, 3D printers or fabrication equipment, and so forth.

Figure 15:
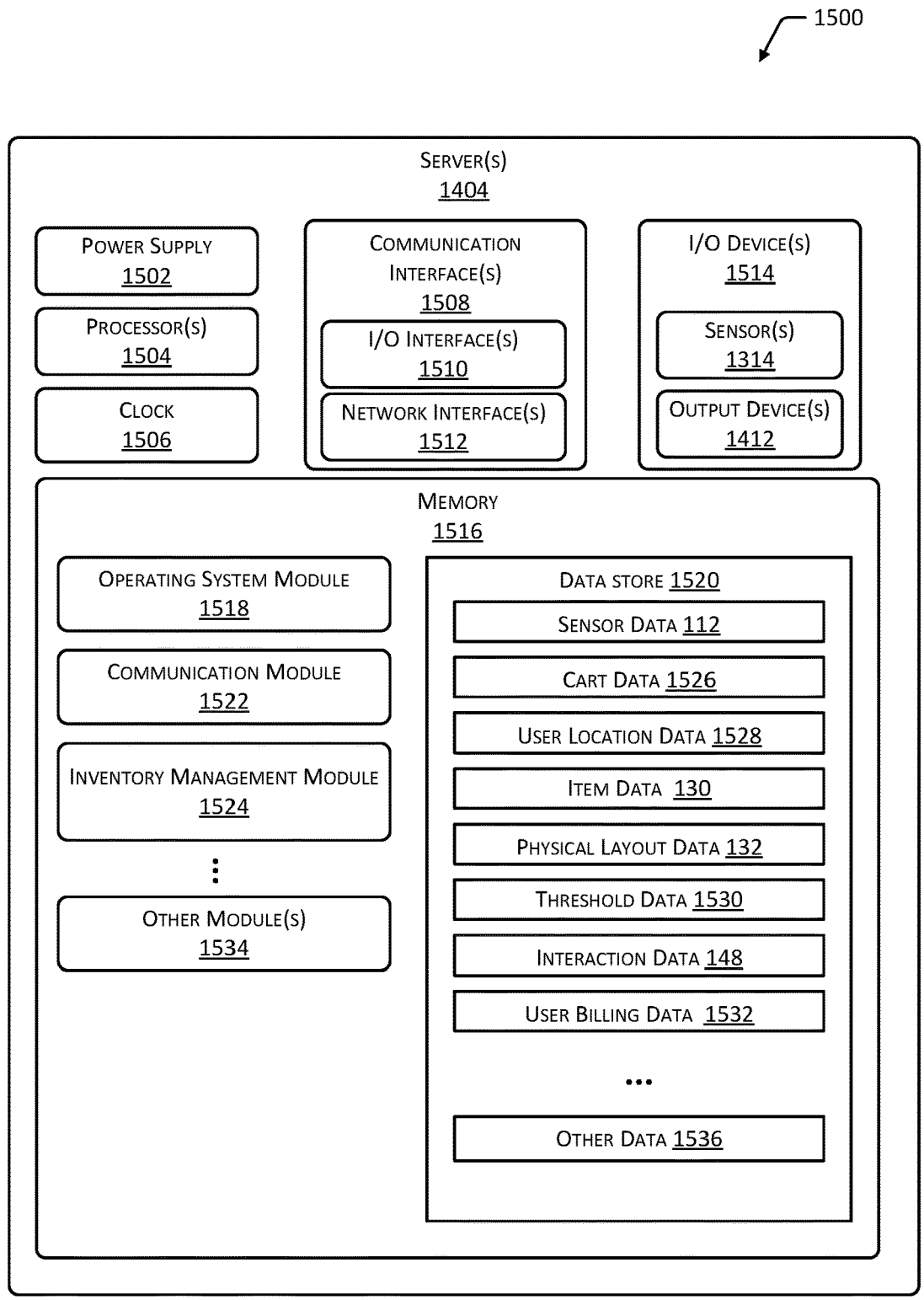
FIG. 15 is a block diagram of a server to support operation of the facility, according to some implementations.

FIG. 15 illustrates a block diagram 1500 of a server 1404 configured to support operation of the facility 1302, according to some implementations. The server 1404 may be physically present at the facility 1302, may be accessible by the network 1402, or a combination of both. The server 1404 does not require end-user knowledge of the physical location and configuration of the system that delivers the services. Common expressions associated with the server 1404 may include "on-demand computing", "software as a service (SaaS)", "platform computing", "network-accessible platform", "cloud services", "data centers", and so forth. Services provided by the server 1404 may be distributed across one or more physical or virtual devices.

One or more power supplies 1502 may be configured to provide electrical power suitable for operating the components in the server 1404. The one or more power supplies 1502 may comprise batteries, capacitors, fuel cells, photovoltaic cells, wireless power receivers, conductive couplings suitable for attachment to an external power source such as provided by an electric utility, and so forth. The server 1404 may include one or more hardware processors 1504 (processors) configured to execute one or more stored instructions. The processors 1504 may comprise one or more cores. One or more clocks 1506 may provide information indicative of date, time, ticks, and so forth. For example, the processor 1504 may use data from the clock 1506 to associate a particular interaction with a particular point in time.

The server 1404 may include one or more communication interfaces 1508 such as input/output (I/O) interfaces 1510, network interfaces 1512, and so forth. The communication interfaces 1508 enable the server 1404, or components thereof, to communicate with other devices or components. The communication interfaces 1508 may include one or more I/O interfaces 1510. The I/O interfaces 1510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1510 may couple to one or more I/O devices 1514. The I/O devices 1514 may include input devices such as one or more of a sensor 1314, keyboard, mouse, scanner, and so forth. The I/O devices 1514 may also include output devices 1412 such as one or more of a display device 1412(3), printer, audio speakers, and so forth. In some embodiments, the I/O devices 1514 may be physically incorporated with the server 1404 or may be externally placed.

The network interfaces 1512 may be configured to provide communications between the server 1404 and other devices, such as the carts 1312, routers, access points 1410, and so forth. The network interfaces 1512 may include devices configured to couple to personal area networks (PANS), local area networks (LANs), wireless local area networks (WLANS), wide area networks (WANs), and so forth. For example, the network interfaces 1512 may include devices compatible with Ethernet, Wi-Fi, Bluetooth, ZigBee, and so forth.

The server 1404 may also include one or more busses or other internal communications hardware or software that allow for the transfer of data between the various modules and components of the server 1404.

As shown in FIG. 15, the server 1404 includes one or more memories 1516. The memory 1516 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1516 provides storage of computer-readable instructions, data structures, program modules, and other data for the operation of the server 1404. A few example functional modules are shown stored in the memory 1516, although the same functionality may alternatively be implemented in hardware, firmware, or as a system on a chip (SoC).

The memory 1516 may include at least one operating system (OS) module 1518. The OS module 1518 is configured to manage hardware resource devices such as the I/O interfaces 1510, the I/O devices 1514, the communication interfaces 1508, and provide various services to applications or modules executing on the processors 1504. The OS module 1518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1516 may be a data store 1520 and one or more of the following modules. These modules may be executed as foreground applications, background tasks, daemons, and so forth. The data store 1520 may use a flat file, database, linked list, tree, executable code, script, or other data structure to store information. In some implementations, the data store 1520 or a portion of the data store 1520 may be distributed across one or more other devices including the servers 1404, network attached storage devices, and so forth.

A communication module 1522 may be configured to establish communications with one or more of the carts 1312, sensors 1314, display devices 1412(3), other servers 1404, or other devices. The communications may be authenticated, encrypted, and so forth.

The memory 1516 may store an inventory management module 1524. The inventory management module 1524 is configured to provide the inventory functions as described herein with regard to the inventory management system 114. For example, the inventory management module 1524 may track items 108 between different inventory locations 102, to and from the carts 1312, generate restocking orders, direct operation of robots within the facility, and so forth. The inventory management module 1524 may access sensor data 112 such as one or more of weight data from the weight sensors 104, image data, received data, and so forth.

Information used by the inventory management module 1524 may be stored in the data store 1520. For example, the data store 1520 may be used to store the sensor data 112, cart data 1526, user location data 1528, the item data 130, the physical layout data 132, threshold data 1530, the interaction data 148, the user billing data 1532, and so forth.

The cart data 1526 comprises information about the items 108 that are determined to be in the custody of the user 110. For example, the cart data 1526 may indicate the items 108 that are within the cart 1312 that is associated with the account of the user 110, currently being carried by the user 110, and so forth. The cart data 1526 may be based at least in part on the interaction data 148. For example, the interaction data 148 may be associated with a particular user 110, changing the contents of the cart data 1526 based on the interaction.

The inventory management module 1524 may generate the user location data 1528 that is indicative of the location of the user 110 within the facility 1302. For example, the inventory management module 1524 may use image data obtained by the cameras 1314(1) to determine a location of the user 110. In other implementations, other techniques may be used for determining the user location data 1528. For example, data from the smart floor 1312(2) may be used to determine the location of the user 110. Based on the user location data 1528 and the interaction data 148, a particular interaction may be associated with an account of a particular user 110. For example, if the user location data 1528 indicates that the user 110 is present in front of inventory location 102(492) at time 17:47:20 and the interaction data 148 indicates a pick of a quantity of one item 108(D) from area 106(D) on inventory location 102(492) at 17:47:27, the user 110 may be billed for that pick.

The threshold data 1530 comprises the various thresholds used by the system. For example, the threshold data 1530 may specify values for confidence thresholds that are used to determine if a hypothesis is deemed suitable to be used to generate the interaction data 148.

The inventory management module 1524 may generate user billing data 1532 based on the cart data 1526. For example, when a user 110 leaves the facility 1302, the items in the cart data 1526 and their respective quantities may be used to generate user billing data 1532. In some implementations, the user billing data 1532 may be used to bill a payment account associated with the user 110.

The inventory management module 1524 may utilize the physical layout data 132 during operation. The physical layout data 132 may provide information indicative of where cameras 1314(1), weight sensors 104, antennas for the radio receivers 1314(3), inventory locations 102, and so forth are in the facility 1302 with respect to one another. For example, the physical layout data 132 may comprise information representative of a map or floor plan of the facility 1302 with relative positions of inventory locations 102 and cameras 1314(1).

The inventory management module 1524 may process the sensor data 112 and generate output data. For example, based on the interaction data 148, a quantity of a type of item 108 at a particular inventory location 102 may drop below a threshold restocking level. The system may generate output data comprising a restocking order indicative of the inventory location 102, the area 106, and a quantity needed to replenish stock to a predetermined level. The restocking order may then be used to direct a robot to restock that inventory location 102.

Other modules 1534 may also be present in the memory 1516 as well as other data 1536 in the data store 1520.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:

accessing first weight data obtained by a first weight sensor located at a first corner of a shelf;

determining a first weight change at the first corner of the shelf based on a first weight measurement at a first time by the first weight sensor and a second weight measurement at a second time by the first weight sensor;

accessing second weight data obtained by a second weight sensor located at a second corner of the shelf;

determining a second weight change at the second corner of the shelf based on a third weight measurement at the first time by the second weight sensor and a fourth weight measurement at the second time by the second weight sensor;

accessing physical layout data indicative of:
 a physical configuration with respect to the shelf of the first weight sensor and the second weight sensor; and
 an area of the shelf that is associated with stowage of a type of item;

accessing item data indicative of the type of item designated as being stowed in the area of the shelf;

determining a first set of event hypotheses based on the physical layout data, the item data, the first weight change, and the second weight change, wherein each of the event hypotheses in the first set of event hypotheses is indicative of one or more of:
 a possible pick from the shelf of a possible quantity of the type of item from the area of the shelf, or
 a possible place to the shelf of a possible quantity of the type of item to the area of the shelf;

determining, using the first weight change and the second weight change as inputs to a model, first confidence values for the event hypotheses in the first set of event hypotheses, wherein the model comprises, for one or more of the event hypotheses in the first set of event hypotheses:
 a first probability distribution function based on weight values associated with the type of item as measured at the first corner of the shelf and based on a location of the type of item as stowed on the shelf, wherein the first probability distribution function accepts as input the first weight change and produces as an output a second confidence value indicative of a likelihood that the first weight change is associated with the type of item; and
 a second probability distribution function based on weight values associated with the type of item as measured at the second corner of the shelf and based on the location of the type of item as stowed on the shelf, wherein the second probability distribution function accepts as input the second weight change and produces as an output a third confidence value indicative of a likelihood that the second weight change is associated with the type of item;

selecting one or more event hypotheses in the first set of event hypotheses based at least in part on the first confidence values; and generating, based on the one or more event hypotheses that are selected, data indicative of one or more of a type of an interaction with the shelf, the type of item involved in the interaction, or a quantity of the type of item involved in the interaction.

2. The method of claim 1, wherein:
the first confidence value for an event hypothesis is based on the second confidence value and the third confidence value.

3. The method of claim 1, further comprising:
determining, based on the first weight change and the second weight change, an estimated location of a weight change with respect to the shelf;

determining, for the each event hypothesis in the first set of event hypotheses, a fourth confidence value indicative of a correspondence between the estimated location and an area indicated by the each event hypothesis; and wherein the one or more event hypotheses in the first set of event hypotheses are further selected based at least in part on the fourth confidence values.

4. A method comprising:
accessing first weight data obtained by a first group of one or more weight sensors located at a first side of an inventory location;

determining, based on the first weight data, a first weight change at the first side of the inventory location based on a first weight measurement and a second weight measurement;

accessing second weight data obtained by a second group of one or more weight sensors located at a second side of the inventory location;

determining, based on the second weight data, a second weight change at the second side of the inventory location based on a third weight measurement and a fourth weight measurement;

determining a first set of event hypotheses based at least in part on one or more of the first weight change or the second weight change, wherein each event hypothesis in the first set of event hypotheses describes a possible pick from the inventory location of a possible quantity of a type of item or a possible place to the inventory location of a possible quantity of the type of item; and determining, using the first weight change and the second weight change as inputs to a first model, a first confidence value for at least one of the event hypotheses in the first set of event hypotheses, wherein:
 the first model comprises a joint probability distribution function based on weight values associated with the type of item as measured at both the first side and the second side of the inventory location and based on a location of the type of item as stowed at the inventory location,
 the joint probability distribution function accepts as input the first weight change and the second weight change, and
 the joint probability distribution function produces as an output the first confidence value indicative of a likelihood that the first weight change and the second weight change are associated with the type of item.

5. The method of claim 4, further comprising:
selecting one or more event hypotheses in the first set of event hypotheses based at least in part on the first confidence value of the at least one of the event hypotheses in the first set of event hypotheses; and generating, based on the one or more event hypotheses that are selected, data indicative of one or more of a type of an interaction with the inventory location, a type of item involved in the interaction, or a quantity of the type of item involved in the interaction.

6. The method of claim 4, wherein the first model further comprises, for the at least one of the event hypotheses in the first set of event hypotheses:
 a first probability distribution function based on weight values associated with the type of item as measured at the first side of the inventory location and based on the location of the type of item as stowed at the inventory location, wherein the first probability distribution function accepts as an input the first weight change and produces as an output a second confidence value indicative of a likelihood that the first weight change is associated with the type of item; and a second probability distribution function based on weight values associated with the type of item as measured at the second side of the inventory location and based on the location of the type of item as stowed at the inventory location, wherein the second probability distribution function accepts as an input the second weight change and produces as an output a third confidence value indicative of a likelihood that the second weight change is associated with the type of item.

7. The method of claim 4, further comprising:

accessing third weight data that is associated with the type of item and comprises a plurality of weight measurements obtained by the one or more weight sensors;

determining a plurality of detected weight changes based on the plurality of weight measurements;

determining a first probability distribution function based on the plurality of detected weight changes of the type of item, wherein the first probability distribution function accepts as input a first weight value and produces as output a first likelihood that the first weight value is associated with the type of item;

accessing data indicative of relative locations with respect to the inventory location of the one or more weight sensors in the first group and the one or more weight sensors in the second group;

accessing data indicative of a relative location with respect to the inventory location of an area within the inventory location that is associated with stowage of the type of item; and based on the first probability distribution function, the data indicative of relative locations with respect to the inventory location of the one or more weight sensors in the first group and the one or more weight sensors in the second group, and the data indicative of the relative location with respect to the area within the inventory location that is associated with the stowage of the type of item:

determining a second model, the second model comprising a second probability distribution function based on weight values associated with the type of item and the relative location with respect to the inventory location of the area within the inventory location that is associated with the stowage of the type of item; and determining a third model, the third model comprising a third probability distribution function based on the weight values associated with the type of item and the relative location with respect to the inventory location of the area within the inventory location that is associated with the stowage of the type of item.

8. The method of claim 4, wherein the determining the first set of event hypotheses further comprises:

accessing physical layout data indicative of:

a physical configuration, with respect to the inventory location, of the first group of one or more weight sensors and the second group of one or more weight sensors; and an area within the inventory location that is associated with stowage of the type of item;

accessing item data indicative of the type of item designated as being stowed in the area; and determining, based on the physical layout data, the item data, the first weight change, and the second weight change, one or more of:

the possible pick from the inventory location of the possible quantity of the type of item from the area, or the possible place to the inventory location of the possible quantity of the type of item to the area.

9. The method of claim 4, wherein the determining the first set of event hypotheses further comprises:

accessing event hypothesis constraint data indicative of one or more of:

a maximum number of types of items per event hypothesis, a maximum quantity per type of item per event hypothesis, or a maximum number of interactions per event hypothesis, wherein an interaction comprises an addition of a particular item to the inventory location or removal of the particular item from the inventory location; and limiting the first set of event hypotheses to those event hypotheses for which each event hypothesis comprises one or more of:

less than the maximum number of types of items,
less than the maximum quantity per type of item, or
less than the maximum number of interactions.

10. The method of claim 4, further comprising:

ranking the first set of event hypotheses based on the first confidence value for the at least one of the event hypotheses in the first set of event hypotheses;

determining a difference between a corresponding first confidence value of a first ranked event hypothesis of the first set of event hypotheses and a corresponding first confidence value of a second ranked event hypothesis of the first set of event hypotheses is greater than a threshold value; and generating, based on the first ranked event hypothesis, data indicative of one or more of a type of an interaction with the inventory location, the type of item involved in the interaction, or a quantity of the type of item involved in the interaction.

11. The method of claim 4, further comprising:

determining, based on the first weight change and the second weight change, an estimated location with respect to the inventory location;

determining, for the at least one of the event hypotheses in the first set of event hypotheses, a correspondence value indicative of a correspondence between the estimated location and a location indicated by the at least one of the event hypotheses;

determining, for the at least one of the event hypotheses in the first set of event hypotheses, a second confidence value based on the first confidence value and the correspondence value;

selecting one or more event hypotheses in the first set of event hypotheses based at least in part on the second confidence value; and generating, based on the one or more event hypotheses that are selected, data indicative of one or more of a type of an interaction with the inventory location, the type of item involved in the interaction, or a quantity of the type of item involved in the interaction.

12. The method of claim 4, further comprising:

selecting one or more event hypotheses in the first set of event hypotheses based at least in part on the first confidence value for the at least one of the event hypotheses in the first set of event hypotheses;

generating, based on the one or more event hypotheses that are selected, data indicative of a change in quantity of the type of item;
accessing previous quantity on hand data indicative of a quantity of the type of item at the inventory location prior to the first weight change and the second weight change; and
determining current quantity on hand data based on the previous quantity on hand data and the change in quantity.

13. A system comprising:
an inventory location to stow one or more types of items;
a first group of one or more weight sensors located at a first portion of the inventory location;
a second group of one or more weight sensors located at a second portion of the inventory location; and
one or more processors to execute instructions to:
   access first weight data obtained by the first group of one or more weight sensors;
   determine, based on the first weight data, a first weight change based on a first weight measurement and a second weight measurement;
   access second weight data obtained by the second group of one or more weight sensors;
   determine, based on the second weight data, a second weight change based on a third weight measurement and a fourth weight measurement;
   determine a first set of event hypotheses based at least in part on one or more of the first weight change or the second weight change, wherein each event hypothesis in the first set of event hypotheses describes one or more of a possible pick from the inventory location of a possible quantity of a type of item or a possible place to the inventory location of a possible quantity of the type of item; and
   determine, using the first weight change and the second weight change as inputs to a first model, a first confidence value for at least one of the event hypotheses in the first set of event hypotheses, wherein:
      the first model comprises a joint probability distribution function based on weight values associated with the type of item as measured at both the first portion and the second portion of the inventory location and based on a location of the type of item as stowed at the inventory location,
      the joint probability distribution function accepts as an input the first weight change and the second weight change, and
      the joint probability distribution function produces as an output the first confidence value indicative of a likelihood that the first weight change and the second weight change are associated with the type of item.

14. The system of claim 13, the one or more processors to further execute the instructions to:
access event hypothesis constraint data indicative of one or more of:
   a maximum number of types of items per event hypothesis,
   a maximum quantity per type of item per event hypothesis, or
   a maximum number of interactions per event hypothesis, wherein an interaction comprises an addition of a particular item to the inventory location or removal of the particular item from the inventory location; and
limit the first set of event hypotheses to those event hypotheses for which each event hypothesis comprises one or more of:
   less than the maximum number of types of items,
   less than the maximum quantity per type of item, or
   less than the maximum number of interactions.

15. The system of claim 13, wherein the first model further comprises, for the at least one of the event hypotheses in the first set of event hypotheses:
a first probability distribution function based on weight values associated with the type of item as measured at the first portion of the inventory location and based on the location of the type of item as stowed at the inventory location, wherein the first probability distribution function accepts as input the first weight change and produces as an output a second confidence value indicative of a likelihood that the first weight change is associated with the type of item; and
a second probability distribution function based on weight values associated with the type of item as measured at the second portion of the inventory location and based on the location of the type of item as stowed at the inventory location, wherein the second probability distribution function accepts as input the second weight change and produces as an output a third confidence value indicative of a likelihood that the second weight change is associated with the type of item; and
wherein the first confidence value for the at least one of the event hypotheses in the first set of event hypotheses is based on the second confidence value and the third confidence value.

16. The system of claim 13, the one or more processors to further execute the instructions to:
rank the first set of event hypotheses based on the first confidence value for the at least one of the event hypotheses in the first set of event hypotheses;
determine a difference between the first confidence value of a first ranked event hypothesis of the first set of event hypotheses and the first confidence value of a second ranked event hypothesis in the first set of event hypotheses is greater than a threshold value; and
generate, based on the first ranked event hypothesis, data indicative of one or more of a type of an interaction with the inventory location, the type of item involved in the interaction, or a quantity of the type of item involved in the interaction.

17. The system of claim 13, the one or more processors to further execute the instructions to:
determine, based on the first weight change and the second weight change, an estimated location with respect to the inventory location;
determine, for the at least one of the event hypotheses in the first set of event hypotheses, a correspondence value indicative of a correspondence between the estimated location and a location indicated by the at least one of the event hypotheses in the first set of event hypotheses;
determine, for the at least one of the event hypotheses in the first set of event hypotheses, a second confidence value based on the first confidence value and the correspondence value;
select one or more event hypotheses in the first set of event hypotheses based at least in part on the second confidence values; and
generate, based on the one or more event hypotheses that are selected, data indicative of one or more of a type of an interaction with the inventory location, the type of item involved in the interaction, or a quantity of the type of item involved in the interaction.

18. The system of claim 13, wherein:
the inventory location comprises a platform; and
the first group of one or more weight sensors comprises a first load cell that is proximate to a first side of the inventory location and the second group of one or more weight sensors comprises a second load cell that is proximate to a second side of the inventory location.

19. The system of claim 13, the one or more processors to further execute the instructions to:
select one or more event hypotheses in the first set of event hypotheses based at least in part on the first confidence value for the at least one of the event hypotheses in the first set of event hypotheses; and
generate, based on the one or more event hypotheses that are selected, data indicative of one or more of a type of an interaction with the inventory location, the type of item involved in the interaction, or a quantity of the type of item involved in the interaction.

20. The system of claim 13, the one or more processors to further execute the instructions to:
access third weight data that is associated with the type of item and comprises a plurality of weight measurements obtained by the one or more weight sensors;
determine a plurality of detected weight changes based on the plurality of weight measurements;
determine a first probability distribution function based on the plurality of detected weight changes of the type of item, wherein the first probability distribution function accepts as input a first weight value and produces as output a first likelihood that the first weight value is associated with the type of item;
access data indicative of relative locations with respect to the inventory location of the one or more weight sensors in the first group and the one or more weight sensors in the second group;
access data indicative of a relative location with respect to the inventory location of an area within the inventory location that is associated with stowage of the type of item; and
based on the first probability distribution function, the data indicative of relative locations with respect to the inventory location of the one or more weight sensors in the first group and the one or more weight sensors in the second group, and the data indicative of the relative location with respect to the inventory location of the area within the inventory location that is associated with stowage of the type of item:
determine a second probability distribution function based on weight values associated with the type of item as measured at the first portion of the inventory location and further based on the relative location with respect to the inventory location of the area within the inventory location that is associated with stowage of the type of item, wherein the second probability distribution function accepts as input the first weight change and produces as an output a second confidence value indicative of a likelihood that the first weight change is associated with the type of item; and
determine a third probability distribution function based on weight values associated with the type of item as measured at the second portion of the inventory location and further based on the relative location with respect to the inventory location of the area within the inventory location that is associated with stowage of the type of item, wherein the third probability distribution function accepts as input the second weight change and produces as an output a third confidence value indicative of a likelihood that the second weight change is associated with the type of item; and
wherein the first confidence value is based on the second confidence value and the third confidence value.

* * * * *

UNITED STATES PATENT AND TRADEMARK OFFICE
CERTIFICATE OF CORRECTION

| | |
|---|---|
| PATENT NO. | : 11,263,583 B1 |
| APPLICATION NO. | : 15/939061 |
| DATED | : March 1, 2022 |
| INVENTOR(S) | : Kumar et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 197 days.

Signed and Sealed this
Thirteenth Day of December, 2022

Katherine Kelly Vidal
*Director of the United States Patent and Trademark Office*